United States Patent
Thomas et al.

(10) Patent No.: US 11,686,011 B2
(45) Date of Patent: Jun. 27, 2023

(54) VERTICALLY-ALIGNED GRAPHENE-CARBON FIBER HYBRID ELECTRODES AND METHODS FOR MAKING SAME

(71) Applicant: University of Central Florida Research Foundation, Inc., Orlando, FL (US)

(72) Inventors: Jayan Thomas, Orlando, FL (US); Jayesh Cherusseri, Orlando, FL (US); Kowsik Sambath Kumar, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 309 days.

(21) Appl. No.: 16/951,150

(22) Filed: Nov. 18, 2020

(65) Prior Publication Data
US 2021/0147999 A1 May 20, 2021

Related U.S. Application Data

(60) Provisional application No. 62/937,378, filed on Nov. 19, 2019.

(51) Int. Cl.
*C25D 13/02* (2006.01)
*H01M 4/583* (2010.01)
(Continued)

(52) U.S. Cl.
CPC ............ *C25D 17/10* (2013.01); *C25D 13/02* (2013.01); *H01G 11/32* (2013.01); *H01G 11/40* (2013.01);
(Continued)

(58) Field of Classification Search
CPC ........ H01M 4/582; H01G 11/32; H01G 11/40
See application file for complete search history.

(56) References Cited

U.S. PATENT DOCUMENTS

| 4,865,931 A | 9/1989 | McCullough |
| 5,518,836 A | 5/1996 | McCullough |
(Continued)

FOREIGN PATENT DOCUMENTS

| CN | 105470003 A | 4/2016 |
| CN | 105679551 B | 2/2018 |

OTHER PUBLICATIONS

Varma, et al. Fiber-Type Solar Cells, Nanogerators, Batteries, and Suercapacitors for Wearable Applications; Advanced Science 2018, 5, 1800340, 32 pages (reference 1 in the specification).
(Continued)

*Primary Examiner* — Amanda C. Walke
(74) *Attorney, Agent, or Firm* — Fleit Intellectual Property Law; Paul D. Bianco

(57) ABSTRACT

Graphene electrodes-based supercapacitors are in demand due to superior electrochemical characteristics. However, commercial applications have been limited by inferior electrode cycle life. A method to fabricate highly efficient supercapacitor electrodes using pristine graphene sheets vertically-stacked and electrically connected to the carbon fibers which results in vertically-aligned graphene-carbon fiber nanostructure is disclosed. The vertically-aligned graphene-carbon fiber electrode prepared by electrophoretic deposition possesses a mesoporous three-dimensional architecture which enabled faster and efficient electrolyte-ion diffusion with a specific capacitance of 333.3 F $g^{-1}$. The electrodes have electrochemical cycling stability of more than 100,000 cycles with 100% capacitance retention. Apart from the electrochemical double layer charge storage, the oxygen-containing surface moieties and $\alpha$-Ni(OH)$_2$ present (Continued)

on the graphene sheets enhance the charge storage by faradaic reactions. This enables the assembled device to provide a gravimetric energy density of 76 W h kg$^{-1}$ with a 100% capacitance retention even after 1,000 bending cycles.

11 Claims, 22 Drawing Sheets

(51) Int. Cl.
    *C25D 17/10*     (2006.01)
    *H01M 4/04*     (2006.01)
    *H01G 11/32*     (2013.01)
    *H01G 11/40*     (2013.01)
    *H01M 4/02*     (2006.01)

(52) U.S. Cl.
    CPC ......... *H01M 4/0457* (2013.01); *H01M 4/583* (2013.01); *H01M 2004/021* (2013.01)

(56) References Cited

U.S. PATENT DOCUMENTS

| | | |
|---|---|---|
| 6,361,900 B1 | 3/2002 | Parmentier |
| 8,192,863 B2 | 6/2012 | Best |
| 9,605,193 B2 * | 3/2017 | Yuen ................ C01B 32/23 |
| 2011/0164349 A1 | 7/2011 | Snyder |
| 2015/0162140 A1 | 6/2015 | Hucker |
| 2017/0050533 A1 | 2/2017 | Wei |
| 2017/0200570 A1 | 7/2017 | Ciocanel et al. |
| 2018/0040912 A1 | 2/2018 | Chang |
| 2019/0103235 A1 | 4/2019 | Hudak |
| 2020/0358079 A1 | 11/2020 | Hudak |
| 2021/0126243 A1* | 4/2021 | Lanning ............ H01M 10/0565 |
| 2021/0126246 A1* | 4/2021 | Gazda .................. H01M 4/587 |
| 2021/0147999 A1 | 5/2021 | Thomas |
| 2022/0139639 A1 | 5/2022 | Thomas |

OTHER PUBLICATIONS

Cherusseri et al., Self-Standing Cardon Nanotube Forest Electodes for Flexible Supercapacitors; RSC Advances 2015, 5, 34335-34341; The Royal Society of Chemistry (reference 6A in the specification).
Cherusseri et al., Ultra-flexible Fibrous Supercapacitors with Carbon Nanotube/polypyrrole Brush-like Electrodes, J. Mater. Chem. A. 2016, 4, 9910-9922; The Royal Society of Chemistry (reference 6B in the specification).
W. Liu et al., Flexible and Stretchable Energy Storage: Recent Advances and Future Perspectives; Advanced Materials; Advanced Science News 2017, 29, 1603436, 34 pages (reference 8A in the specification).
L. Dong et al., Flexible Electrodes and Supercapacitors for Wearable Energy Storage; a review by category Journal of Materials Chemistry A, 2016, 4, p. 4659-4685; The Royal Society of Chemistry (reference 8B in the specification).
X. Cai et al., Flexible Planar/Fiber-architectured Supercapacitors for Wearable Energy Storage Journal of Materials Chemistry C, 2014, 2, p. 1184-1200. The Royal Society of Chemistry (reference 8C in the specification).
J. Cherusseri et al., Self-Standing Cardon Nanotube Forest Electodes for Flexible Supercapacitors; RSC Advance 2015, 5, p. 34335-34341, The Royal Society of Chemistry (reference 10 in the specification).
Z. S. Wu et al., Three-Dimensional Nitrogen and Boron Co-doped Graphene for High-Performance All-Solid-State Supercapacitors; Advanced Materials, 2012, 24, p. 5130-5135 (reference 19 in the specification).
L. F. Lai et al. Preparation of Supercapacitor Electrodes Through Selection of Graphene Surface Functionalities; vol. 6, No. 7, p. 5941-5951, ACS Nano 2012 (reference 23 in the specification).

Wu et al., One Step Electrophoretic Deposition of Ni-Decorated Activated-Cardon Film as an Electrode Material for Supercapacitors; Journal of Physical Chemistry C 2010, 114, p. 6190-6196 (reference 25 in the specification).
C. Du et al., Preparation and Preliminary Property Study of Carbon Nanotubes Films by Electrophoretic Deposition, Material Letters (Elsevier Science) 57, p. 434-438, Dec. 2002 (reference 26 in the specification).
Tao et al., Fabrication of pH-sensitive Graphene Oxide-drug Superamolecular Hydrogels as Controlled Release Systems; Journal of Materials Chemistry 2012, 22, p. 24856-24861 (reference 27 in the specification).
Y. He et al.,Capacitive Mechanism of Oxygen Functional Groups on Carbon Surface in Supercapacitors; Electrochimica Acta (Elsevier Science) 282, p. 618-625, 2018 (reference 28 in the specification).
Cherusseri et al., Hierarchically Mesoporous Cardon Nanpetal Based Electodes for Flexible Supercapacitors with Super-long Cyclic Stability, Journal of Materials Chemistry A 2015, 3, p. 21586-21598. The Royal Society of Chemistry (reference 30 in the specification).
P. Sirisinudomkit et al., Hydrid Energy Storage of Battery-type Nickel Hydroxide and Supercapacitor-type Graphene: redox additve and charge storage mechanism; Sustainable Energy & Fuels 2017, 1, p. 275-279; The Royal Society of Chemistry (reference 35B in the specification).
Shao et al., Mechanism Analysis of the Capacitance Contributions and Ultralong Cycling-stability of the isomorphous MnO2MnO2 core/shell Nanostructures for Supercapacitors; Journal of Materials Chemistry A 2015, 3, 6168-6176; Royal Society of Chemistry (reference 36A in the specification).
Brezesinski, et al., Pseudocapacitive Contributions to Chargw Storage in Highly Ordered Mesoporous Group V Transition Metal Oxides with Iso-Oriented Layed Nanocrystalline Domains, Journal of the American Chemical Society 2010, 132, p. 6982-6990 (reference 36B in the specification).
James F. Snyder; Structural Composite Capacitors, Supercapacitors, and Batteries for U.S. Army Applications, Proceedings of SMASIS08, ASME Conf on Smart Materials, Adaptive Sturcture and Intelligent Systems, Oct. 2008 (8 pages).
Richard Reece et al., High-Performance Structural Supercapacitor, ACS Appl. Mater. Interfaces, (2020), 12, 25683-25695 (20 pages).
Yuchen Wang, Development of structural supercapacitors with epoxy based adhesive polymer electrolyte; Journal of Energy Storage 26 (2019) 100968 (9 pages).
Yanfang Xu et al, High-Performance Structural Supercapacitors Based on Aligned Discontinuous Carbon Fiber Electrodes and Solid Polymer Electrolytes, ACS Appl. Mater. Interfaces, (2021), 13, 11774-11782 (9 pages).
Andrew S. Westover et al, Multifunctional high strength and high energy epoxy composite structural supercapacitors with wet-dry operational stability, J. Mater.Chem.A, (2015), 3, 20097-20102 (6 pages).
Natasha Shirshova et al, Structural composite supercapacitors, www.elsevier.com/locate/compositesa, Composites: Part A 46 (2013) 96-107 (12 pages).
Nicholas Hudak et al, Structural Supercapacitors with Enhanced Performance Using Carbon, J Electorchemical Society, 164 (4) A691-A700 (2017) (11 pages).
Leif Asp et al, Structural Battery and its Multifunctional Performanc, Advanced Energy & Sustainability Research, (2021) (9 pages).
Alexandru Vlad et al., Design Considerations for Unconventional Electrochemical Energy Storage Architectures; www.MaterialsViews.com; Advanced Energy Materials 2015, 54 pages.
Shengli Zhai et al.,Textile energy storage: Structural design concepts, materials election and future perspectives; Energy Storage Materials 3 (2016) 123-139.
International Search Report and Written Opinion for PCT/US2022/033881 dated Sep. 2, 2022.

* cited by examiner

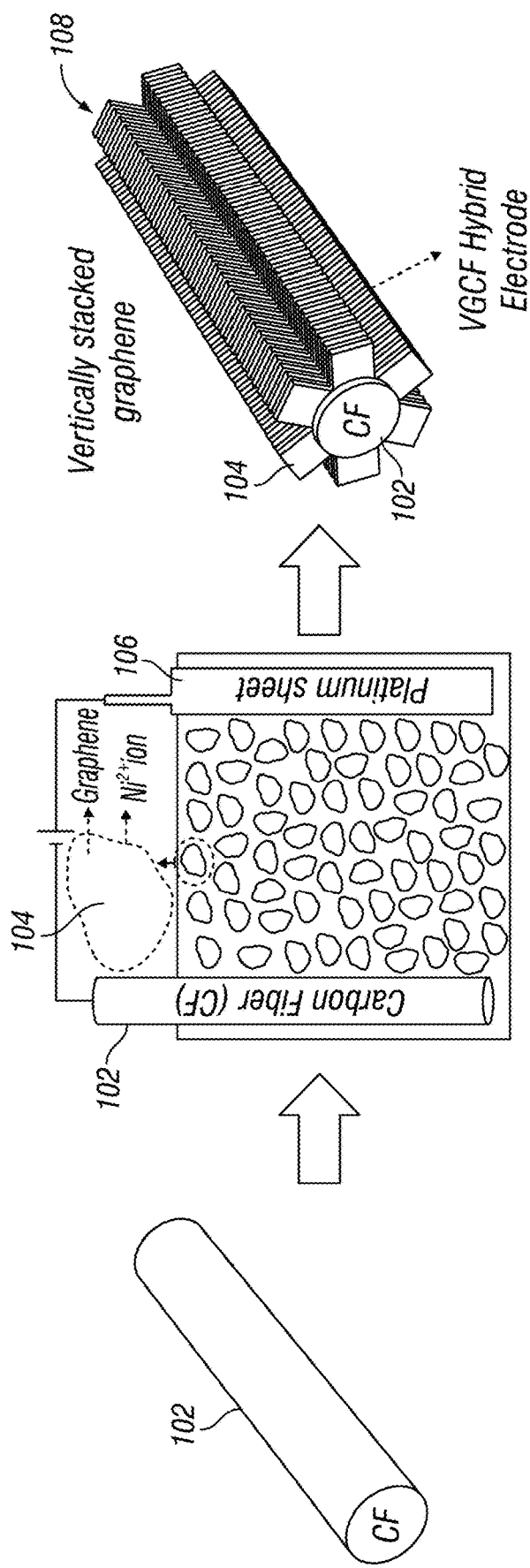

VERTICALLY-ALIGNED GRAPHENE-CARBON FIBER HYBRID ELECTRODES AND METHODS FOR MAKING SAME

FIELD OF THE DISCLOSURE

The disclosure relates to vertically-aligned graphene-carbon fiber electrodes and methods for making the same.

BACKGROUND

The emerging wearable electronic devices require flexible and wearable energy devices to power them. A major challenge for an energy storage device to be used in wearable devices is the toxicity of the components used. Organic electrolytes typically used in energy storage devices like Li-ion batteries, are not an ideal choice for powering wearable devices since they are highly flammable and toxic. Therefore, supercapacitors made with aqueous electrolytes are the best choice for wearable applications.[1] For easy integration with flexible and wearable devices, fiber-type supercapacitors are preferred over currently available can-type commercial supercapacitors since they can be easily weaved or knitted with the fabric/textile. Fibers such as Kevlar fibers[2], metal fibers[3], carbon nanotube (CNT) fibers[4], graphene fibers[5], and carbon fibers (CFs)[6] have been used to prepare wearable supercapacitor electrodes. Breathable and wearable supercapacitors were fabricated using flexible paper electrodes consisting of CNTs and manganese dioxide.[7]

Flexible and stretchable supercapacitors are a hot topic for the next generation flexible and wearable electronic devices.[8] Among the fibers, CF received considerable attention due to their low density, good electrical conductivity, low cost, easy processability, scalability, good mechanical strength, etc. The CFs based supercapacitors exhibit excellent flexibility with high specific capacitances. In addition to providing electrochemical double layer (EDL) capacitance, they can host other electrode-active materials which can store charges either by faradaic or non-faradaic mechanisms. However, synthesizing flexible electrodes for supercapacitors is wearisome due to many reasons. A major problem is the required bendability of the current collector electrode as many of the current collectors are made of rigid metallic plates.[9] Another issue is the detachment of the electrode-active material deposited on the current collector while bending the supercapacitor during its service time. A viable solution is the deposition of the electrode-active material on an electrically conducting fiber substrate and use this as the current collector of the supercapacitor. The electrode-active material coated on the substrate should have good adhesion so that it cannot be delaminated during severe bending and twisting conditions. Metallic substrates are least preferred for flexible supercapacitors due to high density, and inability to achieve high flexibility.

Carbon nanomaterials based materials like CNTs,[10] carbon nanofibers,[11] reduced graphite oxide,[12] carbon nano-onions,[13] graphene,[14] etc. are proven electrode-active materials to achieve high specific capacitance. Among these, graphene evolved as a promising supercapacitor electrode material in the recent past due to its large two-dimensional (2D) surface area, excellent electronic conductivity, and attractive chemical and electrochemical stabilities.[15] Pristine graphene electrodes store charges by the EDL formation at the electrode/electrolyte interface. But in cases where surface functionalization, heteroatoms, and defect sites are present, graphene electrodes exhibit faradaic charge storage too. Supercapacitors with high specific capacitance and long cycle life are in high demand for applications ranging from microelectronics to hybrid electric vehicles.[16]

Graphene based supercapacitor electrodes can deliver high specific capacitances due to the large surface area, but in most cases the surface area of the graphene sheets is hindered by restacking of the individual nanosheets. These restacking of pristine graphene sheets results in low specific capacitance due to the availability of low surface area. Typically, graphene electrodes exhibit a specific capacitance less than 200 F g$^{-1}$. For example, graphene synthesized from graphite oxide (169 F g$^{-1}$)[14] porous graphene obtained by $MnO_2$ etching (67 F g$^{-1}$)[17], argon plasma synthesized graphene (210 F g$^{-1}$)[18], nitrogen and boron co-doped graphene aerogels (62 F g$^{-1}$)[19], KOH-modified graphene (136 F g$^{-1}$)[20], solvothermally synthesized graphene (186 F g$^{-1}$)[21], graphene/polypyrrole composite (165 F g$^{-1}$)[22], etc. showed average specific capacitance. To address this issue, various strategies are adopted to functionalize the graphene surface. But all these processes are time consuming, tedious and adversely affect the cycle life of the electrodes. A typical cycle life of graphene electrodes is less than 10000 cycles.[14, 17-23] However, supercapacitors need to undergo several tens of thousands of cycles during its service period.

Currently, a major problem for graphene-based supercapacitors is the restacking of the layers once made into a supercapacitor even though the 2D surface area of individual graphene sheets is very high. A simple strategy to vertically attach graphene sheets on CF to avoid its restacking problem and exposing the surface area to electrolyte is currently lacking. Such electrodes can be very beneficial to make flexible textile supercapacitors with high capacitance and superlong cycle stability.[24]

Thus, there exists a need for improved vertically-aligned graphene-carbon fiber electrodes and methods of making the same.

SUMMARY

In general, one aspect of the disclosure relates to highly bendable carbon fiber (CF) electrodes with graphene sheets vertically-aligned and attached to it to make highly mesoporous vertically-aligned graphene-carbon fiber (VGCF) hybrid. In another aspect, the 3D mesoporous VGCF hybrid electrode architecture is achieved by electrophoretically depositing graphene sheets on CF substrate using nickel ions as the charged elements in the deposition bath.

In an embodiment, a method of making a hybrid material comprising vertically-aligned graphene stacks on a carbon fiber comprises electrophoretically depositing graphene on a carbon fiber substrate to thereby fabricate the composite material. The method can also include placing a working electrode comprising the carbon fiber substrate in a metallic salt solution, with the metallic salt solution having graphene disbursed therein; electrically connecting the working electrode to a counter electrode; and applying a voltage to the working electrode to thereby electrophoretically deposit the graphene on the carbon fiber substrate.

In an exemplary embodiment, the metallic salt solution is a Nickel solution, such as a Nickel nitrate solution. The metallic salt solution can be dissolved in a solvent, such as an alcohol-based solvent. The graphene can be mixed into the metallic salt solution using, for example, ultrasonication to mix the graphene into the metallic salt solution. The method can also include drying the graphene deposited on the carbon fiber. An oven can be used for the drying.

The disclosure also relates to a hybrid electrode comprising a substrate comprising carbon fibers; and graphene sheets vertically stacked on and electrically connected to the carbon fibers. The hybrid electrode has about 100% capacitance retention after at least 100,000 cycles.

In exemplary embodiments: the hybrid electrode has about 100% capacitance retention after at least 1,000 bending cycles; the carbon fibers have an average diameter of around 6 µm; and/or the hybrid electrode has mesoporous nanostructure.

BRIEF DESCRIPTION OF THE DRAWINGS

A more complete understanding of the present disclosure, and the attendant advantages and features thereof, will be more readily understood by reference to the following description when considered in conjunction with the accompanying drawings wherein:

FIGS. 1A-1D are schematic drawings showing the preparation of an embodiment of a VGCF hybrid electrode according to the disclosure with: FIG. 1A showing CF used as the substrate for electrophoretic deposition; FIG. 1B showing electrophoretic deposition at which CF used as the negative electrode, platinum sheet as the positive electrode and a bath consisting of graphene sheets dispersed in isopropyl alcohol with nickel nitrate hexahydrate; FIG. 1C showing the VGCF hybrid electrode obtained after the electrophoretic deposition; and FIG. 1D representing an easy and fast electron transport from the graphene to CF current collector.

FIGS. 2G-2J are STEM EDS elemental mapping of a vertically-stacked graphene nanosheet with: FIG. 2G showing the STEM EDS mapping image of the portion marked in FIG. 2F; and STEM EDS elemental mapping images of carbon (FIG. 2H), nickel (FIG. 2I), and oxygen (FIG. 2J).

FIGS. 7A-7G show electrochemical characterizations of the VGCF hybrid electrode with: FIG. 7A showing the Nyquist plot (inset: Nyquist plot in the high-frequency region); FIG. 7B showing CV curves at different scan rates; FIG. 7C showing GCD curves at different current densities of VGCF hybrid electrode in aqueous 1 M $H_3PO_4$ electrolyte; FIG. 7D showing specific capacitance retention plot for the VGCF hybrid electrode when cycled at a scan rate of 100 mV $s^{-1}$ for continuous 100000 cycles in aqueous 1 M $H_3PO_4$ electrolyte; FIGS. 7E and 7F showing SEM images of the VGCF hybrid electrode before (FIG. 7E) and after (FIG. 7F) completing 100000 cycles (scale: 200 nm); and FIG. 7G showing the Nyquist plot of the VGCF hybrid electrode before and after cycling.

FIGS. 11A-11D show electrochemical performances of VGCF hybrid supercapacitor with: FIG. 11A showing Nyquist plot (inset: enlarged portion in the high-frequency region); FIG. 11B showing CV curves at different scan rates; FIG. 11C showing calculation of contribution of capacitances from the EDL charge storage (shaded region) and faradaic mechanisms at a scan rate of 25 mV $s^{-1}$; and FIG. 11D showing GCD curves at different current densities of VGCF hybrid supercapacitor in 1 M $H_3PO_4$ aqueous electrolyte.

FIGS. 11E-11H show electrochemical performances of VGCF ASSC with: FIG. 11E showing CV curves at different scan rates; FIG. 11F showing plot of capacitance retention vs. cycle numbers for continuous 17000 cycles (inset: CV curves of first and last cycles at a scan rate of 100 mV $s^{-1}$); FIG. 11G showing plot of capacitance retention at different bending angles (inset: CV curves at different bending angles obtained at a scan rate of 100 mV $s^{-1}$); and FIG. 11H showing a plot of capacitance retention for 1000 bending cycles (inset: digital photograph showing the VGCF ASSC bend at an angle of 90°, scale bar: 1 cm) of VGCF ASSC.

DETAILED DESCRIPTION

Overview

Figure 2A:
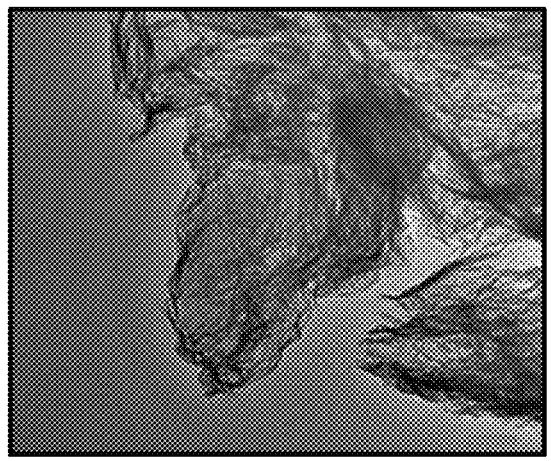
FIG. 2A is a bright-field TEM image of graphene sheets before electrophoretic deposition (scale bar: 100 nm).

As required, embodiments are disclosed herein; however, it is to be understood that the disclosed embodiments are merely examples and that the methods described below can be embodied in various forms. Therefore, specific structural and functional details disclosed herein are not to be interpreted as limiting, but merely as a representative basis for teaching one skilled in the art to variously employ the present subject matter in virtually any appropriately detailed structure and function. Further, the terms and phrases used herein are not intended to be limiting, but rather, to provide an understandable description of the concepts.

It can be advantageous to set forth definitions of certain words and phrases used throughout this disclosure. The terms "a" or "an", as used herein, are employed to describe elements and components described herein. This is done merely for convenience and to give a general sense of the scope of the disclosure. This description should be read to include one or at least one and the singular also includes the plural unless it is obvious that it is meant otherwise. The term plurality, as used herein, is defined as two or more than two. The term another, as used herein, is defined as at least a second or more.

The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

Note that not all of the activities described above in the general description or the examples are required, that a portion of a specific activity may not be required, and that one or more further activities can be performed in addition to those described. Still further, the order in which activities are listed are not necessarily the order in which they are performed.

In general, the disclosure relates to highly bendable carbon fiber (CF) electrodes with graphene sheets vertically-aligned and attached to it to make highly mesoporous vertically-aligned graphene-carbon fiber (VGCF) hybrid. The disclosure also relates to method for making the VGCF hybrid.

The details for one exemplary embodiment of preparation of VGCF hybrid electrode by electrophoretic deposition are schematically shown in FIGS. 1A-1C. A method of electrophoresis was used to deposit activated carbons[25] and carbon nanotubes[26] on electrically conducting substrates. Although any suitable deposition method could be used, electrophoresis has advantages such as short deposition time, simple apparatus for deposition, scalable synthesis, etc. In a non-limiting example, CF 102 with average diameter ~6 μm was used as substrate for the deposition of graphene sheets (FIG. 1A). Electrophoretic deposition of vertically-aligned graphene sheets is achieved via transport of positively charged graphene sheets 104 adsorbed with nickel ions (other metallic ions are also envisioned in the instant disclosure) towards the CF negative electrode 102 (in this case paired with a platinum positive electrode 106) via deposition of graphene sheets with charge neutralization under the application of a D.C. voltage of 50 V (FIG. 1B). The 3D nanostructure of the VGCF hybrid 108 obtained after 30 minutes is shown in FIG. 1C. The voltage and time presented herein are non-limiting example and can be varied to achieve the resulting VGCF hybrid. Depositing graphene on CF substrate enables easy and fast transport of electrons from the graphene to the CF current collector and is schematically shown in FIG. 1D. It is three-dimensional (3D) (as shown in FIG. 1C) but to show the electron transport, it is represented as 2D. Here, the VGCF is further used as electrode-cum-current collector to fabricate a fully flexible VGCF all-solid-state supercapacitor (ASSC). Since no separate current collector is used in the fabrication of the supercapacitor, the total weight of the supercapacitor is substantially reduced unlike in the case of a supercapacitor with metallic current collectors. The VGCF ASSC displayed a specific capacitance of 213.5 F g$^{-1}$ with a high gravimetric energy density of 76 Wh kg$^{-1}$ in a polyvinyl alcohol (PVA)/H$_3$PO$_4$ gel electrolyte.

Figure 2B:
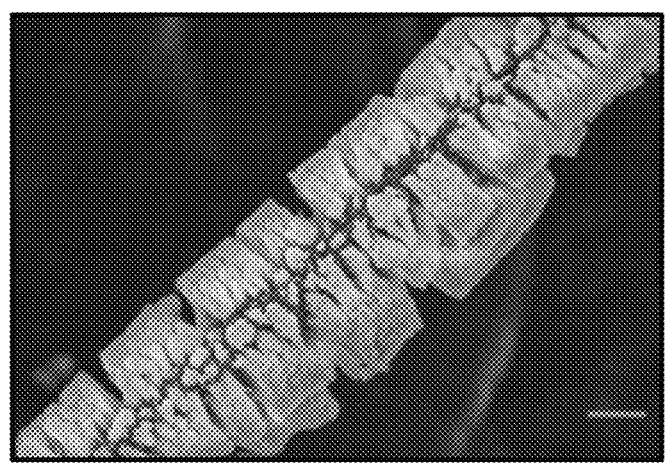
FIGS. 2B and 2C are SEM images of VGCF hybrids at different magnifications (scale: for FIG. 2B is 5 µm, and for FIG. 2C is 200 nm).
Figure 2C:
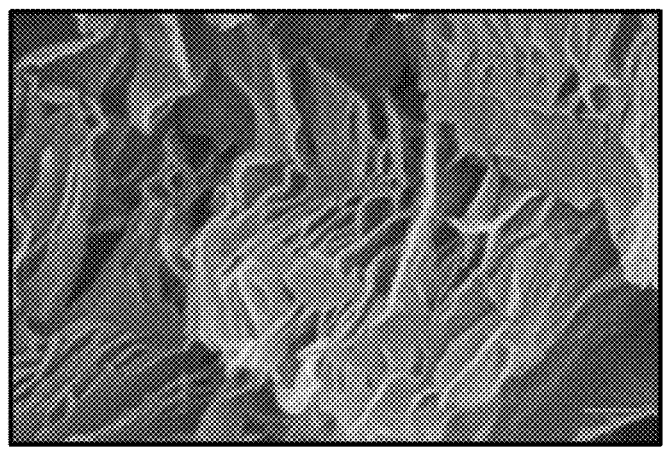
Figure 3:
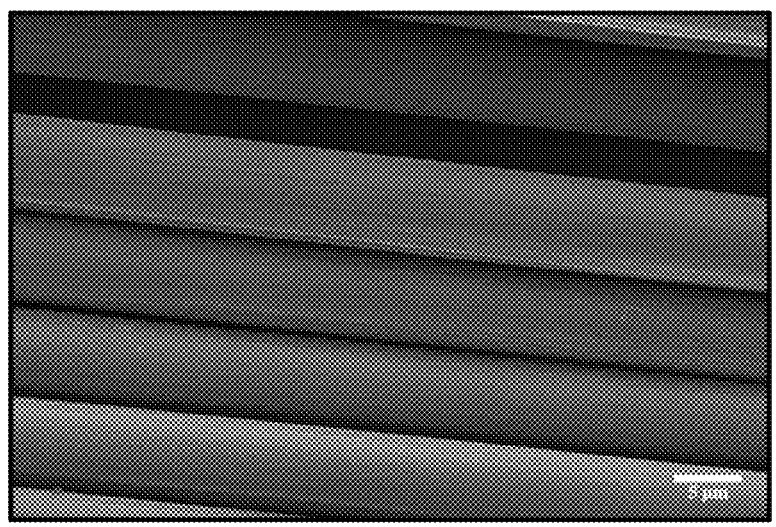
FIG. 3 is an SEM image of pristine carbon fibers.

FIG. 2A shows the bright-field transmission electron microscope (TEM) image of the pristine graphene sheets used in the preparation of VGCF hybrid. The surface morphology of the VGCF hybrid was analyzed using scanning electron microscope (SEM) imaging. FIGS. 2B and 2C show the SEM images of the VGCF hybrids at different magnifications. Here, CF functions as the large surface area-providing electrically conducting backbone (FIG. 3) for the deposition of graphene sheets. The high-resolution SEM image of VGCF hybrids (FIG. 2C) shows a mesoporous architecture formed by the vertical stacking of graphene sheets on the CF substrate. The 3D mesoporous electrode architecture is essential for the fast movement of electrolyte-ions through the pores for enhancing the charge storage either by the EDL formation or by performing faradaic reactions. The attachment of graphene sheets on CF substrate is found to be strong due to the inclusion of nickel hydroxide nanoparticles (the formation of nickel hydroxide is confirmed by X-ray photoelectron spectroscopy (XPS), which will be discussed later). To examine the adhesion strength of the graphene sheets on the CF substrate, the VGCF hybrid is ultrasonicated for a period of 30 minutes.

Figure 2D:
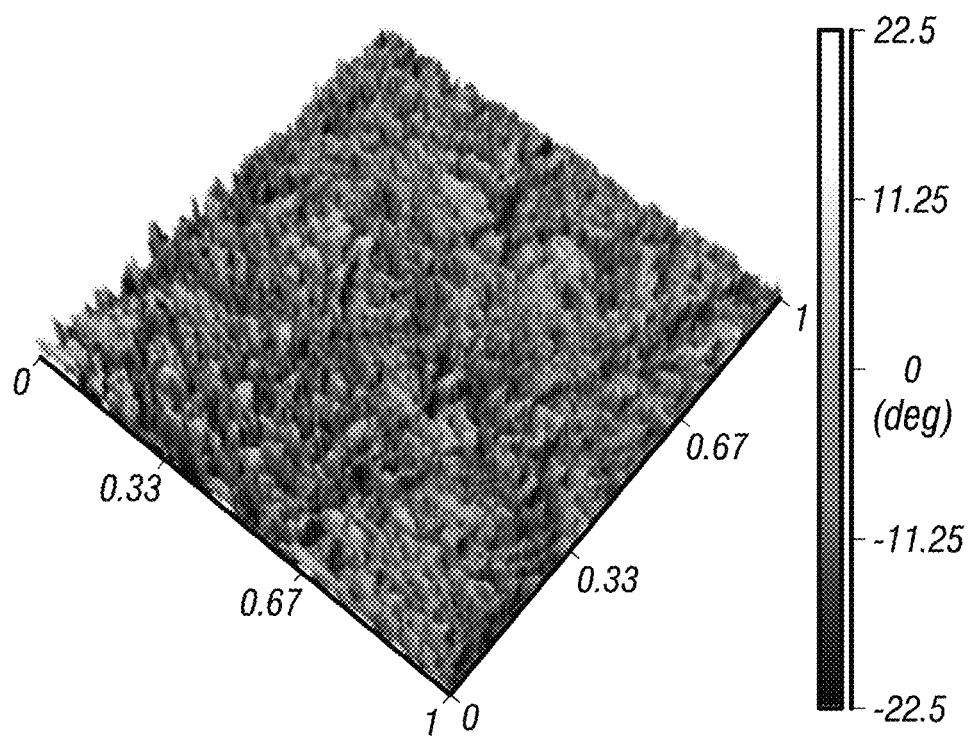
FIGS. 2D and 2E are 3D topographical AFM images of VGCF hybrid before (FIG. 2D) and after ultrasonication (FIG. 2E).
Figure 2E:
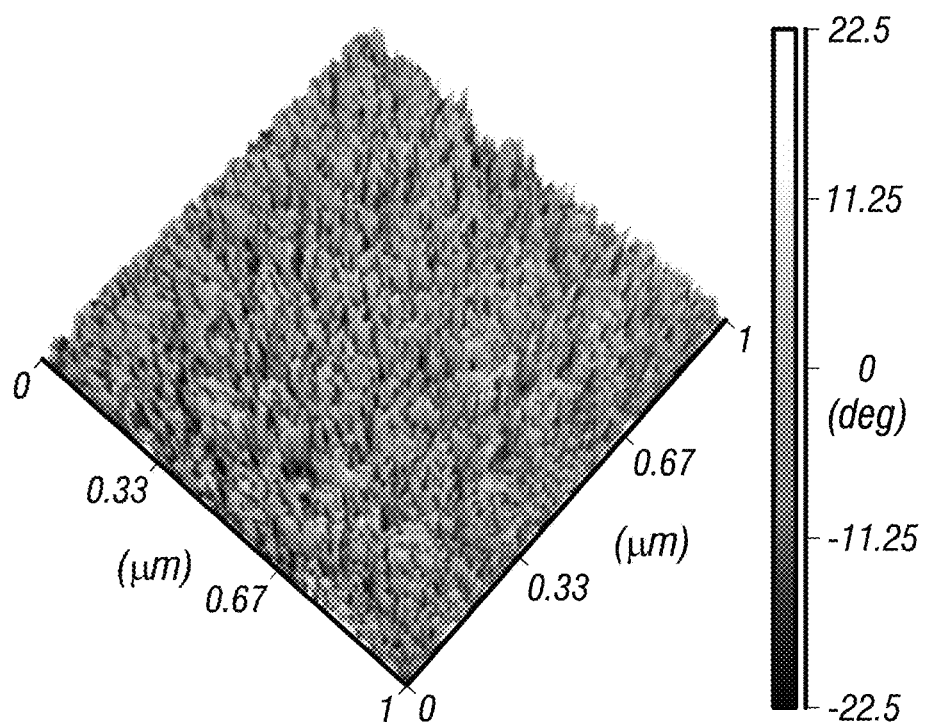
Figure 2F:
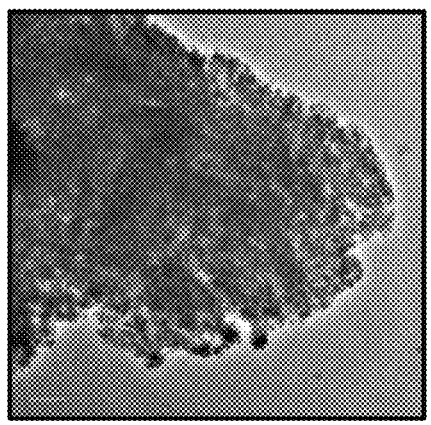
FIG. 2F is an HAADF STEM image (scale: 100 nm) of a vertically-stacked graphene nanosheet.
Figure 2G:
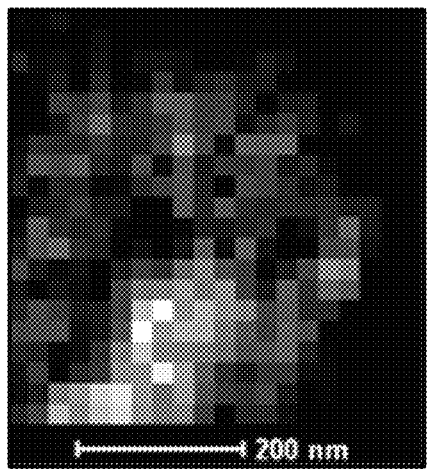
Figure 2H:
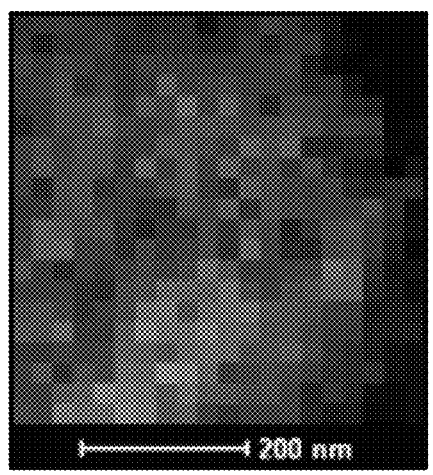
Figure 2I:
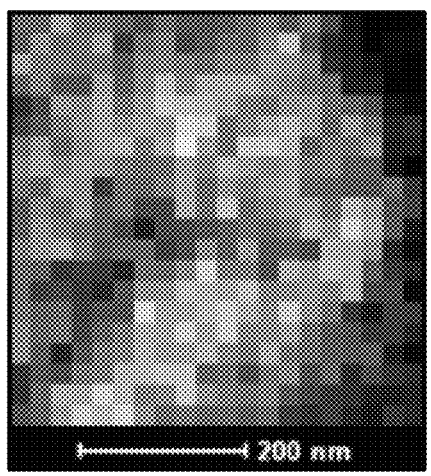
Figure 2J:
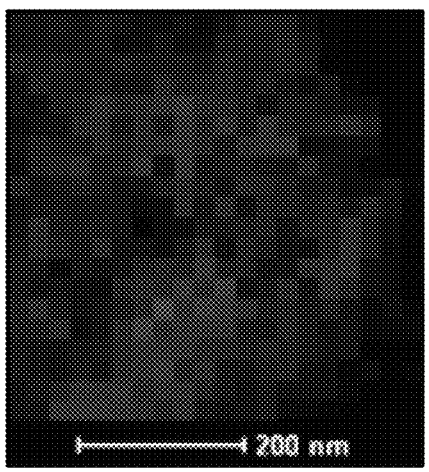
Figure 4:
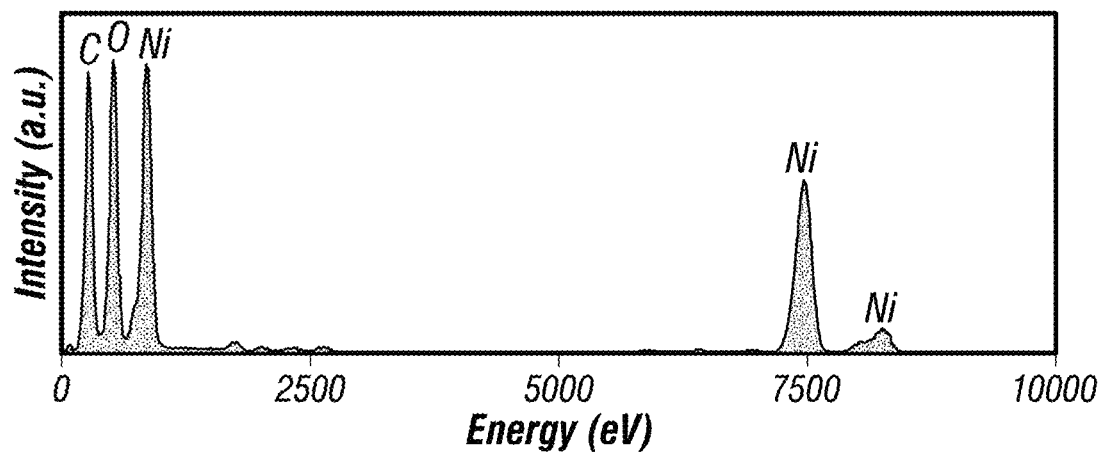
FIG. 4 is an STEM EDS spectrum of VGCF hybrid.
Figure 5A:
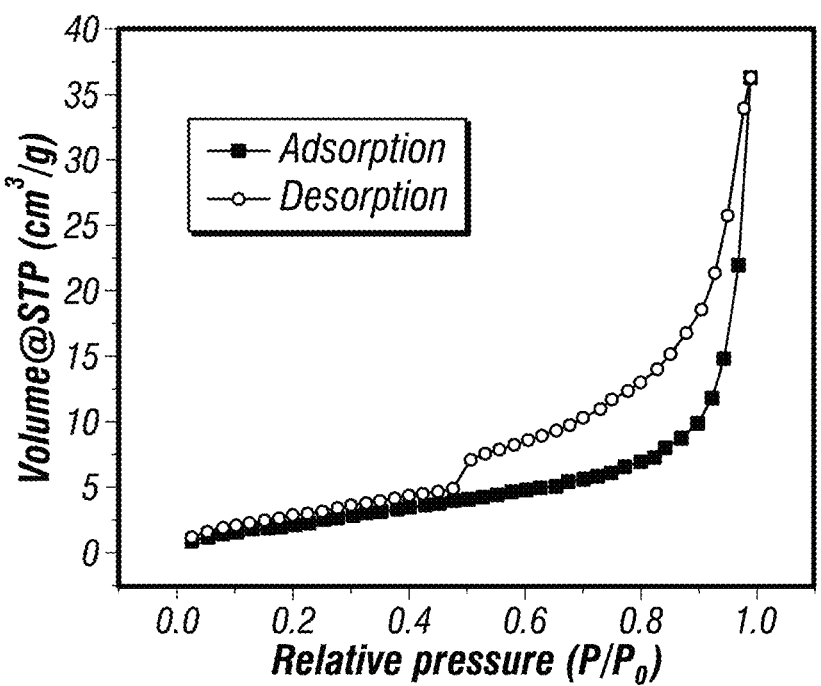
FIGS. 5A and 5B are Nitrogen-sorption isotherms (FIG. 5A) and a BJH pore-size distribution curve of the VGCF hybrid (FIG. 5B).
Figure 5B:
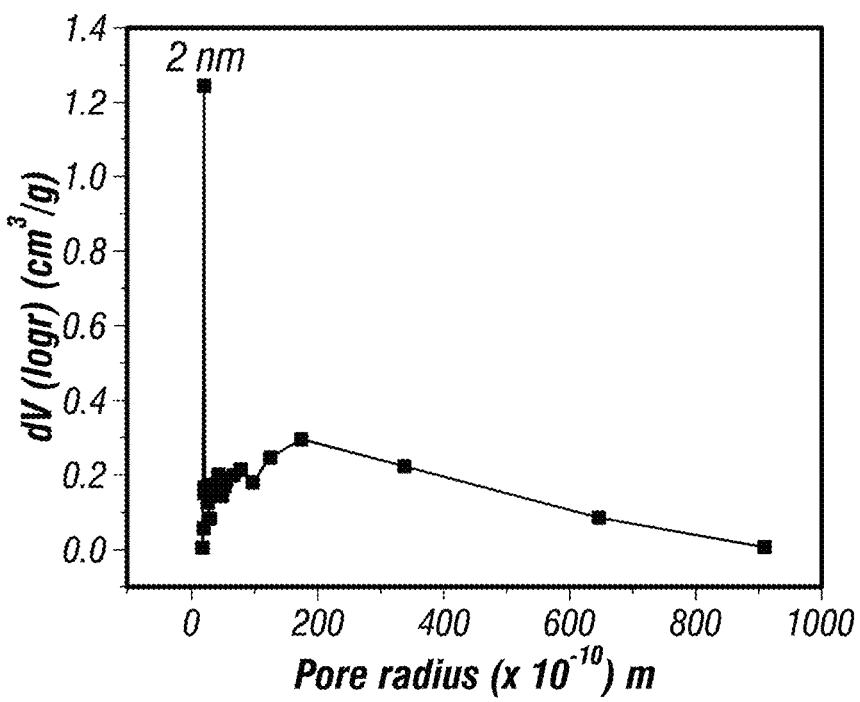

The surface topography of the VGCF hybrid nanostructure was examined before and after the ultrasonication using atomic force microscope (AFM) imaging. The 3D topographical AFM images of the VGCF hybrid nanostructure before and after the ultrasonication are depicted in FIGS. 2D and 2E, respectively. It is evident from these AFM images that the vertically-aligned graphene on CF are still intact. It is also evident that VGCF hybrid exhibits a mesoporous nanostructure. From the high-angle annular dark-field scanning TEM (HAADF-STEM) image of VGCF hybrid shown in FIG. 2F, it is apparent that the graphene sheets are decorated with nickel hydroxide nanoparticles. The STEM energy dispersive X-ray spectroscopy (EDS) elemental mapping (FIGS. 2G-2J) and EDS spectrum (FIG. 4) confirm the presence of nickel in the VGCF hybrids after the deposition. To estimate the surface area, pore volume and pore-size of the VGCF hybrid, Brunauer-Emmett-Teller (BET) surface area measurement is performed using nitrogen as the adsorbed gas. The nitrogen-sorption isotherms of VGCF hybrid (FIG. 5A) indicate that the sorption process is of type V in nature, which demonstrates the capillary condensation of gas within the opened-pores of vertically-stacked graphene sheets. The BET surface area of the VGCF hybrid is found to be 54.59 $m^2/g$. The average pore diameter of VGCF hybrid is calculated from the Barrett-Joyner-Halenda (BJH) pore-size distribution curve (FIG. 5B) and an average pore radius of 2 nm can be observed. The pores within the VGCF hybrid lie in the mesopore range, which is suitable for obtaining high specific capacitance for the supercapacitor electrodes. The total pore volume of VGCF hybrid is found to be $2.508 \times 10^{-2}$ $cm^3$ $g^{-1}$ for pores smaller than 2.6 nm (diameter) at $P/P_o = 0.30242$.

Figure 6A:
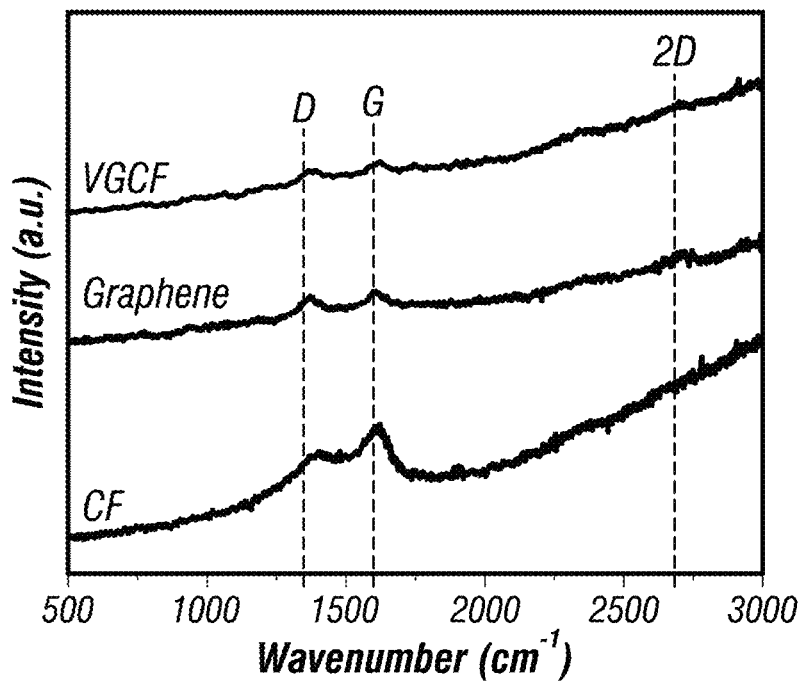
FIG. 6A is fingerprint Raman spectra of CF, graphene sheets and VGCF hybrid.

The structure of the VGCF hybrids is examined by Raman spectroscopy, which is a versatile tool to investigate the structure of materials. The signature Raman spectra of the CF, graphene sheets and the VGCF hybrid are depicted in FIG. 6A. The characteristic peaks located at 1365 $cm^{-1}$ and 1608 $cm^{-1}$ corresponds to D-band and G-band of the graphitic carbon respectively. D-band represents various types of defects and lattice distortions whereas G-band shows the graphitic nature of graphene. The ratio of intensity of D-band ($I_D$) to G-band ($I_G$) for pristine graphene sheets and VGCF are 0.68 and 0.78, respectively. A comparatively higher $I_D/I_G$ ratio observed in the case of VGCF is due to the incorporation of α-Ni(OH)$_2$ nanoparticles on the surface of graphene sheets. Graphene sheets can experience small number of defects as the lattice may get strained upon the α-Ni(OH)$_2$ deposition, which leads to a higher $I_D/I_G$ ratio when compared with the pristine graphene sheets and CF substrate.

Figure 6B:
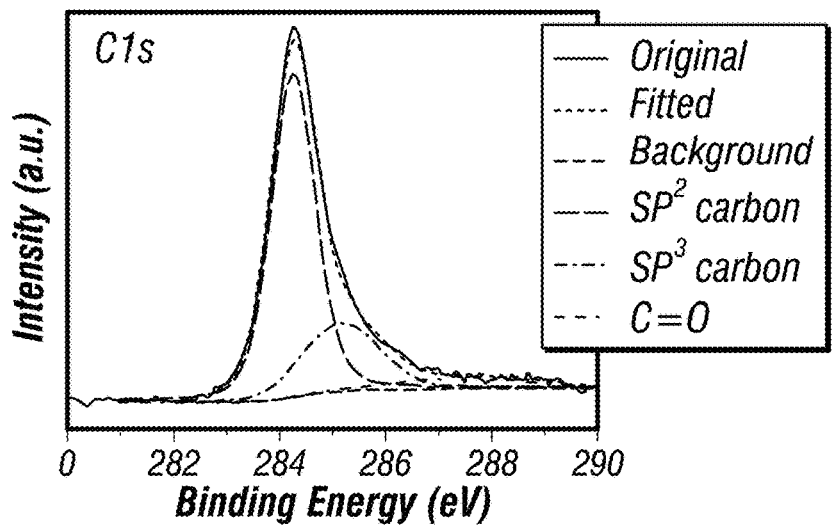
FIGS. 6B and 6C are XPS analysis of pristine graphene sheets with: core-level XPS C1s spectra (FIG. 6B), and O1s spectra (FIG. 6C) of pristine graphene sheets.
Figure 6C:
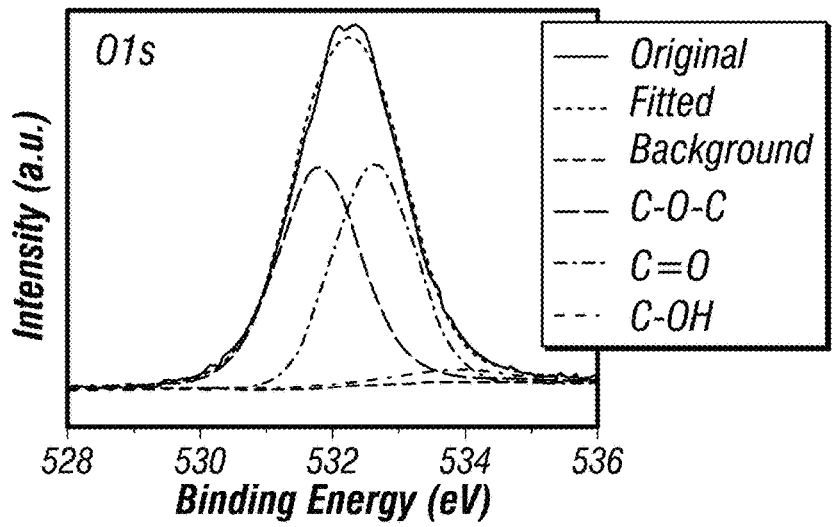

The surface chemical features of the pristine graphene sheets used in the preparation of VGCF hybrid are examined by XPS analysis. The core-level XPS C1s spectrum of pristine graphene sheets shown in FIG. 6B fitted with three peaks positioned at 284.26, 285.17, and 287.48 eV are corresponding to $sp^2$ hybridized carbon, $sp^3$ hybridized carbon and carbon atoms bonded with oxygen, respectively.[27] This shows the presence of oxygen-containing groups on the surface of graphene sheets. To distinguish various oxygen functional groups, the core-level XPS O1s spectrum is recorded for the pristine graphene nanosheets as shown in FIG. 6C. The O1s spectrum can be fitted with three peaks positioned at 531.79, 532.64, and 533.89 eV, respectively and are corresponding to C—O—C, C=O, and C—OH groups, respectively.[27] The core-level XPS spectral analyses clearly shows that surface of pristine graphene sheets are modified by various oxygen-containing surface moieties.

These oxygen functional groups are an added advantage to the supercapacitor electrode as the charge storage can get enhanced by the faradaic charge storage possessed by these groups.

Figure 7A:
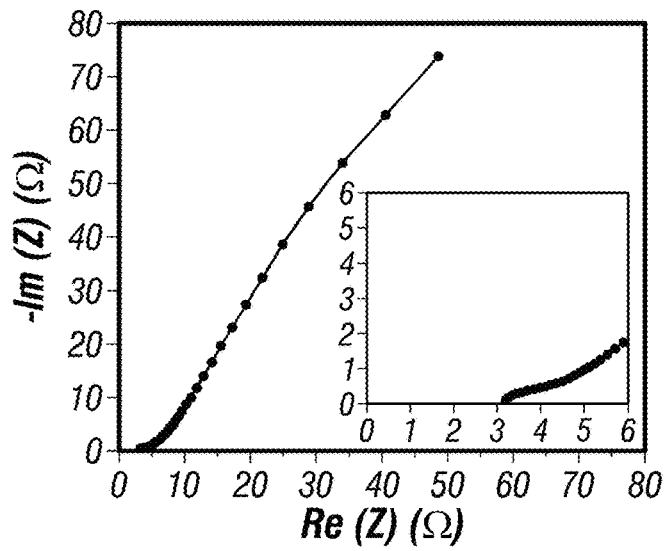
Figure 7B:
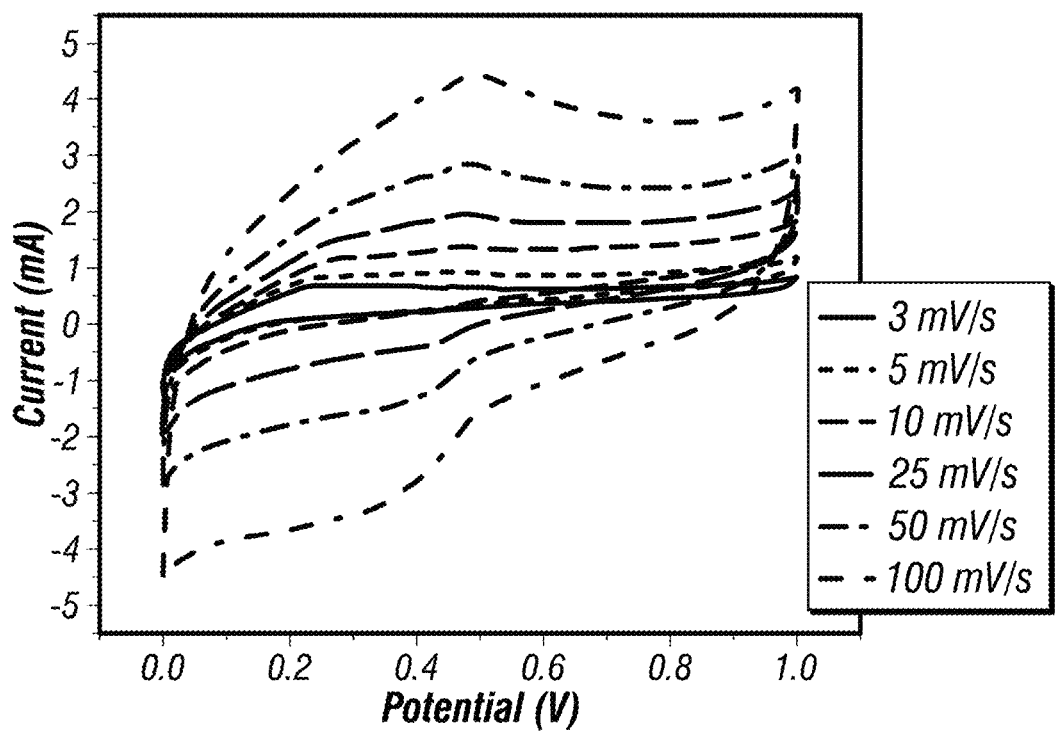
Figure 7C:
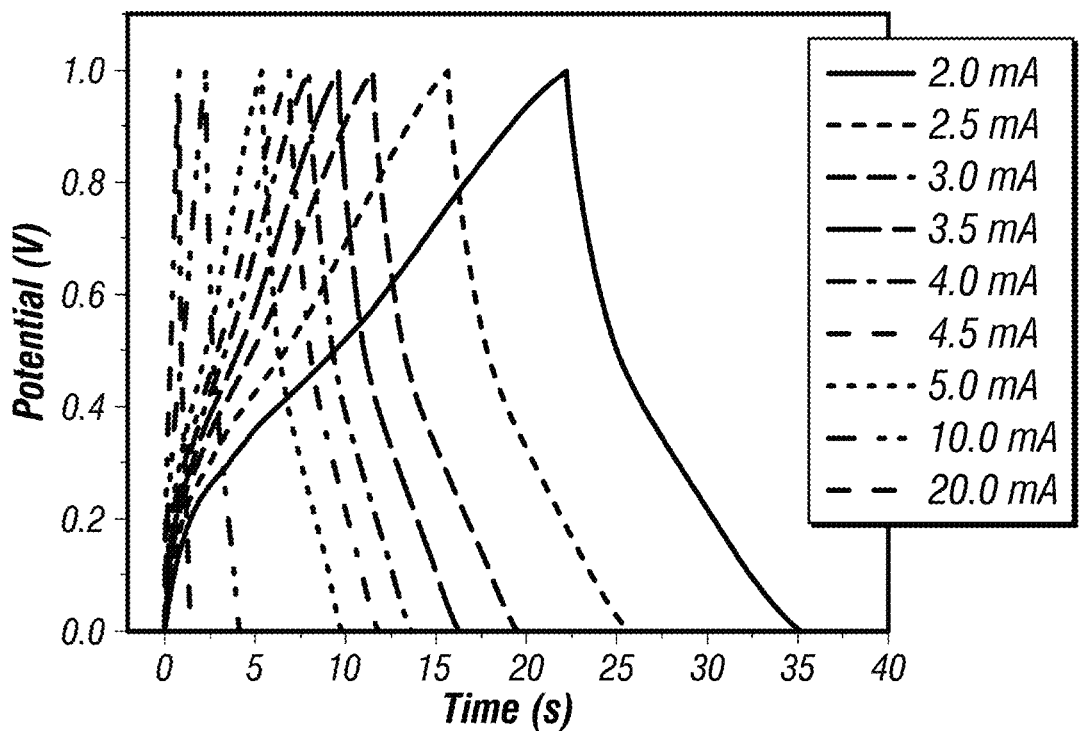

The electrochemical performances of the VGCF hybrid supercapacitor electrodes are evaluated by electrochemical impedance spectroscopy (EIS), cyclic voltammetry (CV), and galvanostatic charge-discharge (GCD) measurements. EIS is a versatile tool in determining the electrochemical series resistance (ESR) of a supercapacitor. FIG. 7A shows the Nyquist plot of the VGCF hybrid electrode and the magnified high-frequency region of the Nyquist plot is given as an inset image. The VGCF hybrid supercapacitor electrodes exhibited an ESR of 350 because of the direct attachment of graphene on CF. FIG. 7B represents the CV curves of the VGCF hybrid supercapacitor electrodes at different scan rates. The CV curves show a typical rectangular nature that depicts the EDL charge storage mechanism but a slightly sloped curve with small amount of reduction/oxidation represents faradaic mechanism. Hence, the hierarchical VGCF hybrid supercapacitor electrodes exhibit hybrid type charge storage in which both non-faradaic and faradaic mechanisms are involved. The faradaic charge storage exhibited by the oxygen functional groups on the surface of graphene sheets of the VGCF hybrid electrode. The shape of the CV curves remains the same at higher scan rates which shows the high rate performance and excellent ionic transport of the VGCF hybrid electrodes. A maximum specific capacitance of 333.3 F $g^{-1}$ is obtained for the VGCF hybrid electrode at a scan rate of 3 mV Such a high capacitance is attributed to the faradaic charge storage possessed by the VGCF hybrid electrode. Recently, He et al. have studied the effect of oxygen-containing surface functional groups on the carbon surface on the electrochemical performance of the supercapacitor electrode and found that the specific capacitance of the electrode gets improved from the enhanced redox reactions possessed by the oxygen functional groups on the surface of carbon based supercapacitor electrodes.[28] Here, the presence of various oxygen functional groups is confirmed from the XPS analysis and they can contribute to the capacitance of the VGCF hybrid electrode by exhibiting redox reactions with the electrolyte. The GCD curves obtained at different current densities (FIG. 7C) represents nearly identical charge and discharge features of the VGCF hybrid electrodes. The GCD curves clearly show a combined EDL and faradaic charge storage mechanisms.

Figure 7D:
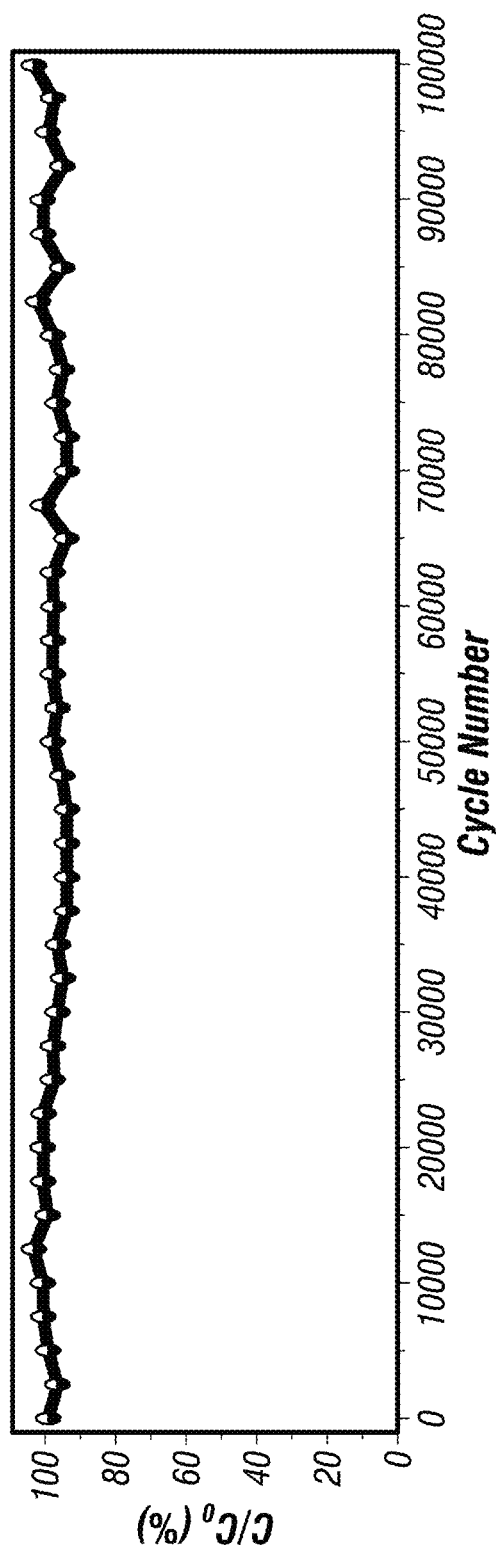

The cycle life of supercapacitor electrode materials is a very important parameter which is critical for commercial capacitors. The electrochemical life of the VGCF hybrid electrodes was determined by performing CV study at a scan rate of 100 mV $s^{-1}$ for continuous 100000 cycles. The retention of capacitance (C) of the VGCF hybrid electrodes at different cycle numbers with respect to the first cycle ($C_o$) is depicted in FIG. 7D. From this figure, it is evident that the VGCF hybrid electrodes exhibited a superlong cycling stability with 100% capacitance retention even after 100000 continuous cycles. The electrode should retain its nanostructure to attain a 100% capacitance retention after the cycling study. A lower cycling stability along with diminished capacitance for many of the supercapacitors reported in the literature is mainly due to the degradation in the electrode-active material and/or the porous electrode structure due to prolonged cycling.[29] But the VGCF hybrid electrode exhibited no such degradation even after 100000 cycles due to the better adhesion of graphene sheets on CF substrate. Also, the vertical stacking allowed the ions to freely move in and out of the graphene sheets without causing any damage to the active material. This enabled obtaining an excellent electrochemical cycling stability.

Figure 7E:
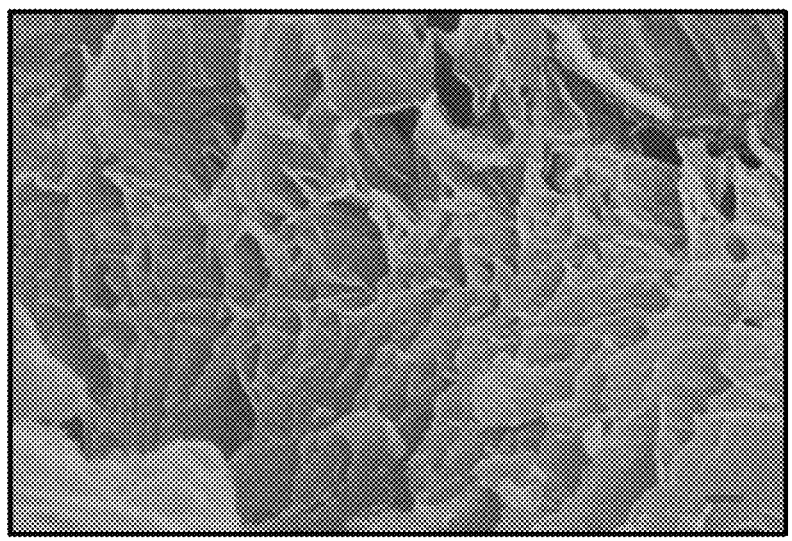
Figure 7F:
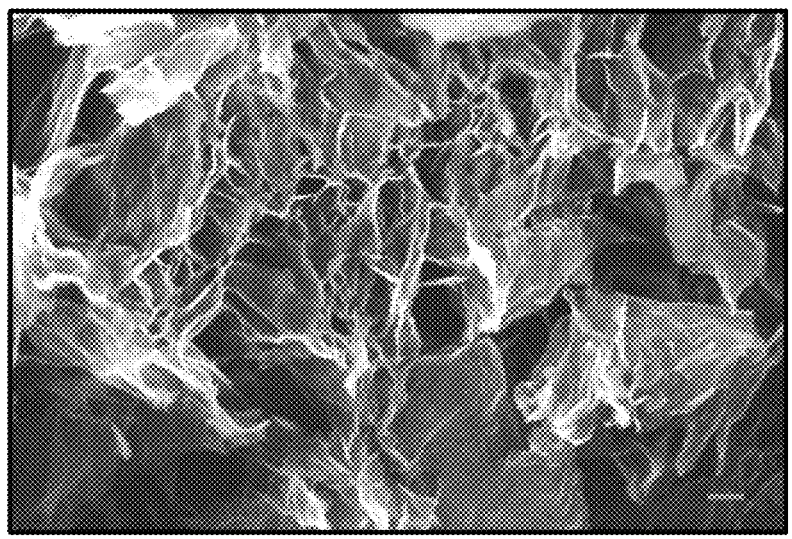
Figure 8:
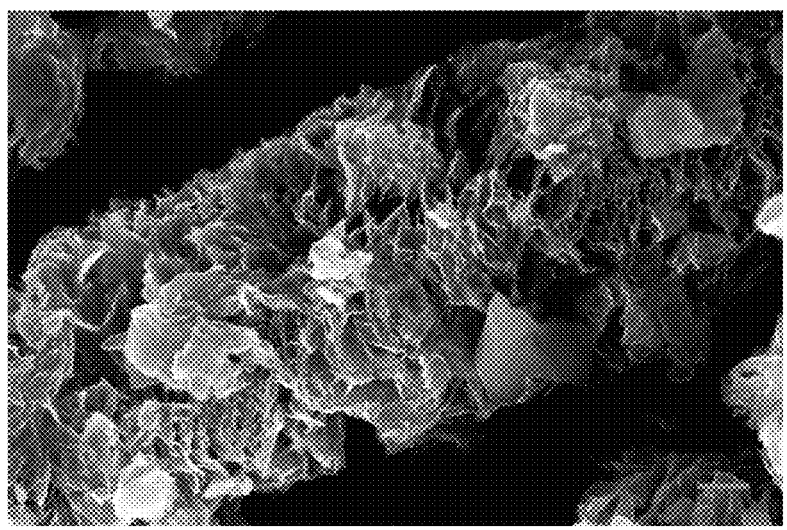
FIG. 8 is an SEM image of VGCF hybrid electrode after completing 100000 cycles (scale bar: 1 µm).

The structure of the VGCF hybrid electrode after completing 100000 cycles is examined using SEM imaging. For comparison purpose, the SEM images obtained before and after 100000 cycles are depicted in FIGS. 7E and 7F, respectively. From these images, it is evident that the morphology of the VGCF hybrid electrode is unaltered (FIG. 8) and exhibited an open porous structure even after 100000 electrochemical cycles. The morphology of the VGCF hybrid electrode after cycling is found different from the pristine electrode before cycling as the former exhibited a more porous electrode architecture.

Figure 7G:
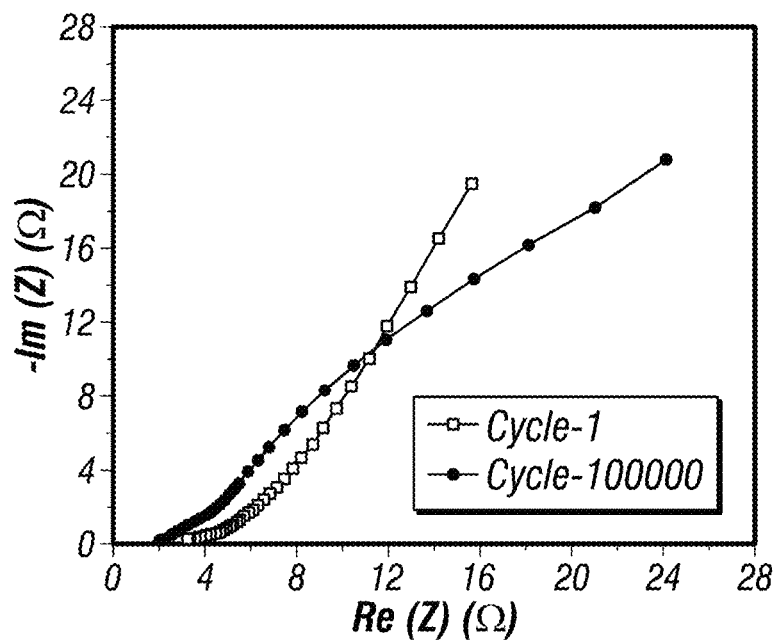
Figure 9:
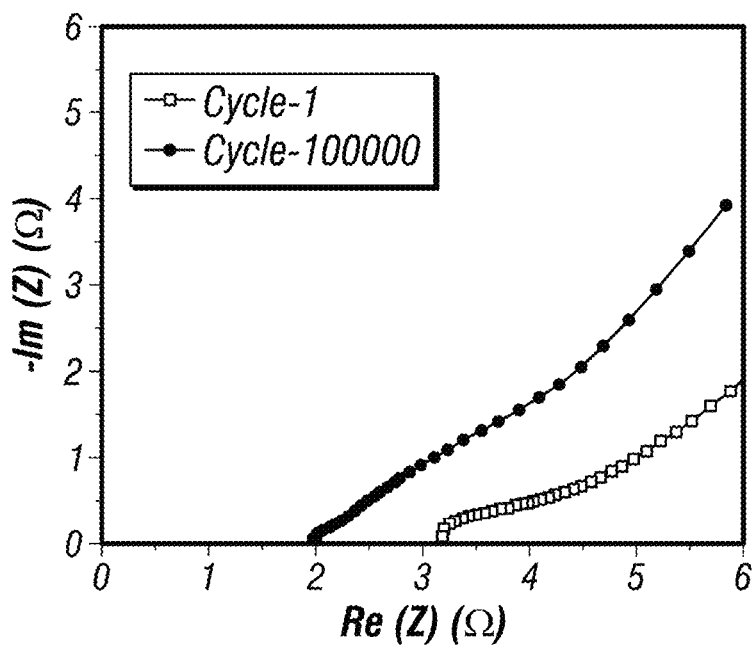
FIG. 9 is a Nyquist plot of the VGCF hybrid electrode after completing 100000 cycles.

The electrochemical cycling has envisaged opening-up of pores and a more porous architecture is achieved for the VGCF hybrid electrode. This is a main reason behind attaining a 100% capacitance retention even after completing 100000 cycles. To compare the ESR of the VGCF hybrid electrode before and after cycling, EIS analysis was performed. FIG. 7G represents the Nyquist plot of VGCF hybrid electrode before and after the electrochemical cycling and no significant change in the nature to the Nyquist plot can be observed. This shows the good electrochemical cycling stability of the VGCF hybrid electrode. The VGCF hybrid electrodes exhibited a comparatively lower ESR of 200 mΩ after cycling (FIG. 9). This may be due to the continuous shuttling of the electrolyte ions during the cycling, which causes opening of the pores within the VGCF hybrid electrode thereby a decrease in resistance is observed.[30]

Figure 10:
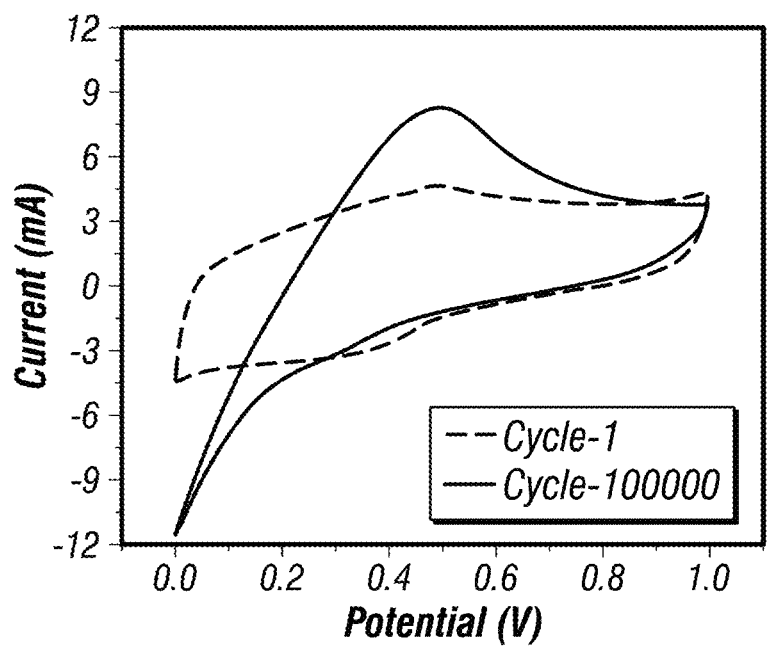
FIG. 10 are CV curves of the VGCF hybrid electrode at its first and $100000^{th}$ cycles.

The CV curves before and after the cycling study (FIG. 10) shows a difference in their profiles. This may be due to the surface activation process of the VGCF hybrid electrode caused due to the continuous shuttling of electrolyte ions towards in and out from the electrodes and such a change in the CV profile is very common in the case of supercapacitor electrode cycling as can be seen in various literatures.[31] In order to understand the composition and the surface chemical features of the VGCF hybrid electrode before and after the electrochemical cycling, again the XPS analysis was performed. The XPS spectra are recorded for the VGCF hybrid electrode before (cycle-1) and after (cycle-100000) the electrochemical cycling. The compositions of various elements present in the VGCF hybrid electrode obtained from the XPS analysis is given in Table I.

TABLE I

Composition of elements in the VGCF hybrid electrode before (Cycle-0) and after electrochemical cycling (Cycle-100000).

| Elements | VGCF hybrid (Before Cycling) (Atomic %) | VGCF hybrid (After Cycling) (Atomic %) |
|---|---|---|
| Carbon | 49.02 | 49.61 |
| Oxygen | 36.28 | 35.92 |
| Nickel | 12.97 | 12.09 |
| Nitrogen | 1.73 | 2.38 |

Figure 6D:
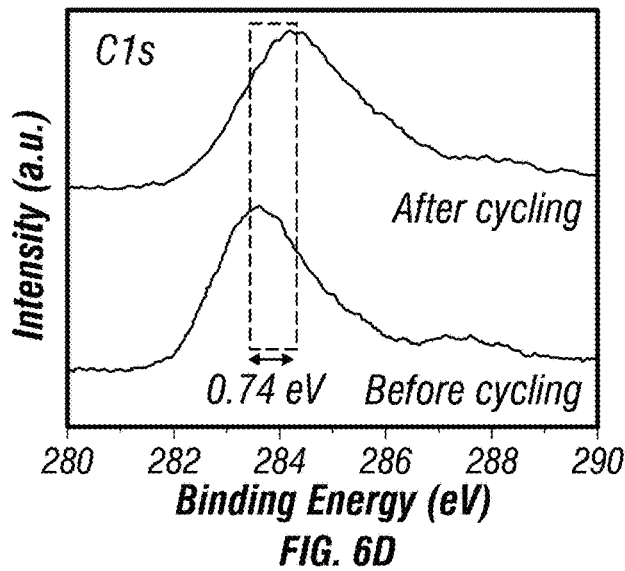
FIGS. 6D-6F are XPS analysis of VGCF hybrid electrode before and after electrochemical cycling with: core-level XPS C1s spectra (FIG. 6D), O1s spectra (FIG. 6E), and Ni2p spectra (FIG. 6F) of VGCF hybrid electrode before (pristine electrode) and after electrochemical cycling (after 100000 cycles).
Figure 6E:
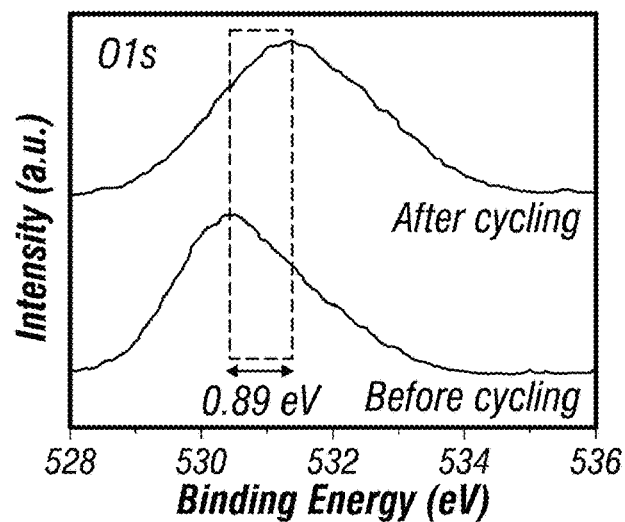

The presence of nitrogen in the VGCF hybrid electrode arises from the CF and a polyacrylonitrile (PAN)-based one was used for this study. PAN-based CFs are rich with nitrogen. It can be observed that the composition of the VGCF hybrid electrode remains almost same except a small change after completing its 100000 cycles. FIGS. 6D and 6E represent the core-level XPS C1s and O1s spectra of the VGCF hybrid electrode before and after the electrochemical cycling, respectively. The nature of these spectra is found different from the pristine graphene sheets used in the preparation of VGCF hybrid (FIGS. 6B and 6C). As compared to the VGCF hybrid before cycling, the C1s spectra of the VGCF hybrid electrode after 100000 cycles shift toward higher binding energies and become wider. A positive shift of 0.74 eV is observed in the case of XPS C1s spectra. A similar shift towards higher binding energy can also be observed from the XPS O1s spectra too (FIG. 6E). A positive shift of 0.89 eV can be observed for the O1s spectra after cycling the VGCF hybrid electrode.

Figure 6F:
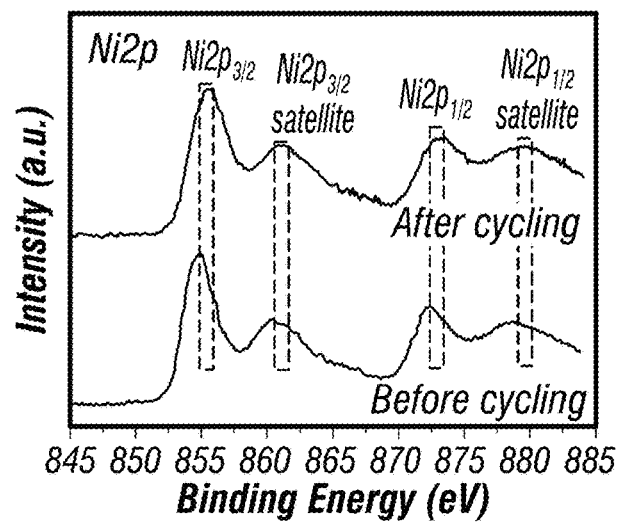

To investigate the reason behind this shift, the XPS spectra of nickel is recorded. FIG. 6F represents the core-level XPS Ni2p spectra of the VGCF hybrid electrode before and after the electrochemical cycling. Surprisingly, both the spectra are corresponding to $\alpha$-Ni(OH)$_2$ instead of the expected nickel metal. Since nickel nitrate hexahydrate was used in the electrophoretic deposition bath, which is the reason behind the formation of Ni(OH)$_2$ instead of nickel metal as such. In the case of VGCF hybrid electrode before cycling, the core-level XPS Ni2p spectrum exhibits four prominent peaks positioned at 854.9, 860.56, 872.37, and 878.99 eV are attributed to the Ni2p$_{3/2}$, Ni2p$_{3/2}$ satellite, Ni2p$_{1/2}$ and Ni2p$_{1/2}$ satellite, respectively and well-matched with the binding energies of the $\alpha$-Ni(OH)$_2$ in the literature.[32] It is to be noted here that nickel oxide is not formed but $\alpha$-Ni(OH)$_2$ is formed instead due to the deposition of hydrated-nickel ions present in the deposition bath. After completing 100000 cycles, these peaks are found to be shifted slightly towards higher binding energy in which the peaks are positioned at 855.47, 861.37, 873.30, and 879.61 eV for the Ni2p$_{3/2}$, Ni2p$_{3/2}$ satellite, Ni2p$_{1/2}$ and Ni2p$_{1/2}$ satellite, respectively. Due to the deposition of $\alpha$-Ni(OH)$_2$ nanoparticles on the surface of graphene sheets, the XPS spectra of VGCF hybrid electrode shifted towards higher binding energy side due to the change in its electronic state.

The deposition of $\alpha$-Ni(OH)$_2$ nanoparticles donate electronic density to the graphene sheets, and the filling of previously empty states causing a raise in the Fermi level.[33] Similar changes in the electronic structure of the graphene sheets upon foreign atom deposition is well studied in the literature.[34] A contribution to the total capacitance is provided by the $\alpha$-Ni(OH)$_2$ nanoparticles as they exhibit faradaic charge storage by taking part in the redox-reactions with the electrolyte.[35] Hence, it can be said that the specific capacitance of the VGCF hybrid electrode is the sum of EDL charge storage possessed by pristine graphene sheets, and the faradaic charge storage exhibited by both the oxygen functional groups on the surface of graphene sheets, and also the faradaic charge storage possessed by the $\alpha$-Ni(OH)$_2$ present on the graphene sheets.

Figure 11A:
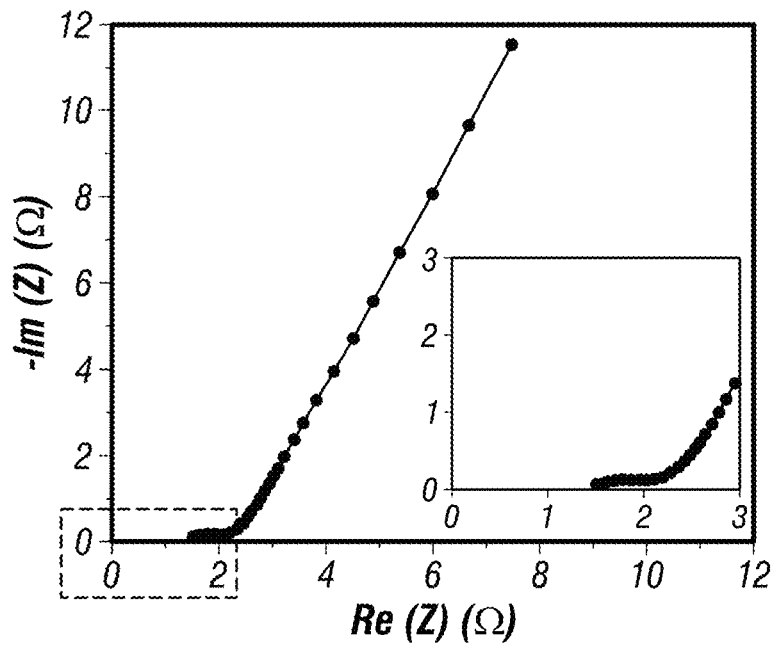
Figure 11B:
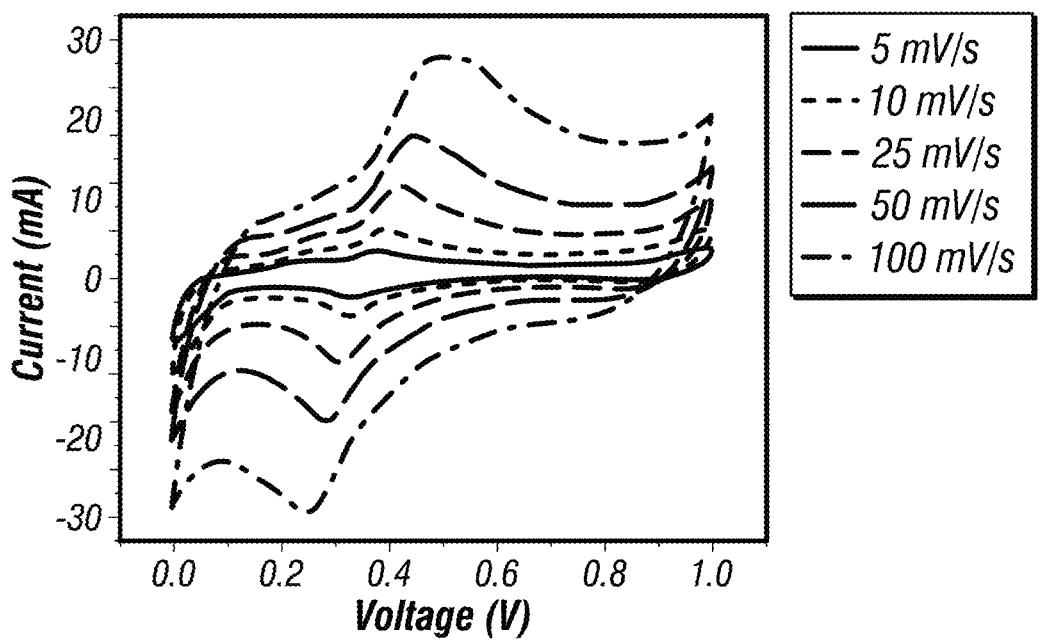

As the VGCF hybrid electrode exhibits long-lasting electrochemical performance hence are potential candidates for application in supercapacitors with long cycle life. To test the practicality of the VGCF hybrid electrode, a symmetric-type supercapacitor using two identical VGCF hybrid electrodes and aqueous 1 M H$_3$PO$_4$ aqueous electrolyte was fabricated. FIG. 11A shows the Nyquist plot of the VGCF hybrid supercapacitor and the Nyquist plot at high-frequency region is given as an inset image. The Nyquist plot of the VGCF hybrid supercapacitor exhibited a high ESR when compared with the VGCF hybrid electrode obtained in the three-electrode cell configuration. The CV curves (FIG. 11B) of the VGCF hybrid supercapacitor exhibits redox characteristics of the VGCF hybrid electrodes due to the faradaic charge storage possessed by the oxygen-containing surface functional moieties present on the graphene sheets as well as the α-Ni(OH)$_2$ nanoparticles present on the graphene sheets. In addition to the capacitance contribution from the pristine graphene sheets and α-Ni(OH)$_2$ nanoparticles, there can be charge storage from the CF substrate too.

Figure 12:
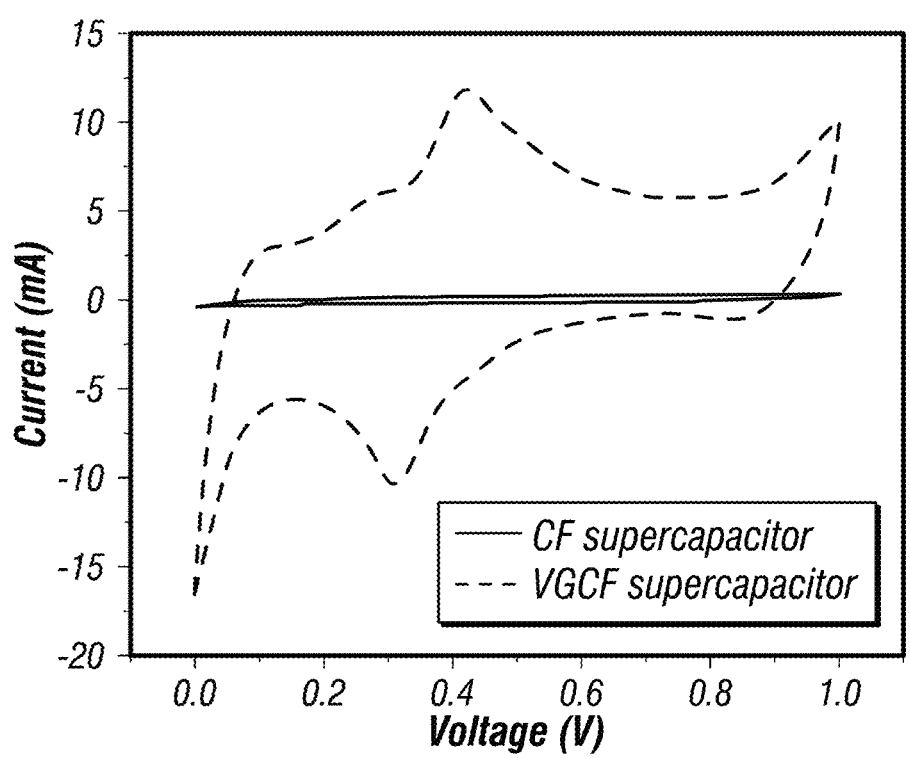
FIG. 12 shows Comparison of CV curves of the symmetric VGCF and pristine CF supercapacitors in 1 M $H_3PO_4$ at a scan rate of 25 mV $s^{-1}$.

To estimate the contribution from the CF substrate, a symmetric supercapacitor was fabricated using two identical (of the same dimensions of VGCF hybrid supercapacitor) pristine CF electrodes. The pristine CF supercapacitor was tested in 1 M H$_3$PO$_4$ aqueous electrolyte by performing CV at a scan rate of 25 mV s$^{-1}$. The CV curves of both the VGCF and pristine CF supercapacitors were compared (FIG. 12) and no significant contribution to the total capacitance was observed. Hence it can be said that the contribution of capacitance is mainly from the EDL-faradaic contribution from graphene sheets and only a negligible contribution from the CF current collector is present. The VGCF hybrid supercapacitor exhibited a maximum specific capacitance of 172 F g$^{-1}$ at a scan rate of 5 mV s$^{-1}$ in 1 M H$_3$PO$_4$ aqueous electrolyte. The 3D mesoporous architecture of the VGCF hybrid electrode has enhanced the faradaic reactions between the electrode-active material and the electrolyte ions.

Figure 11C:
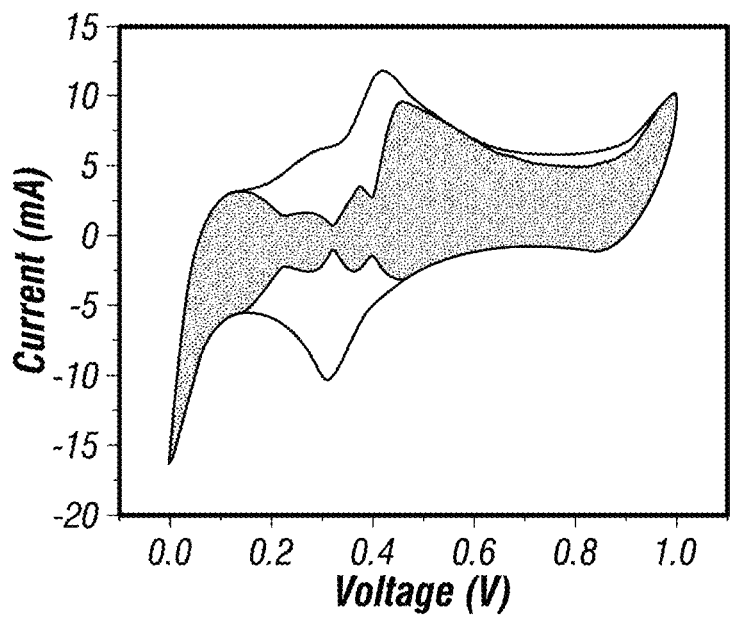
Figure 11D:
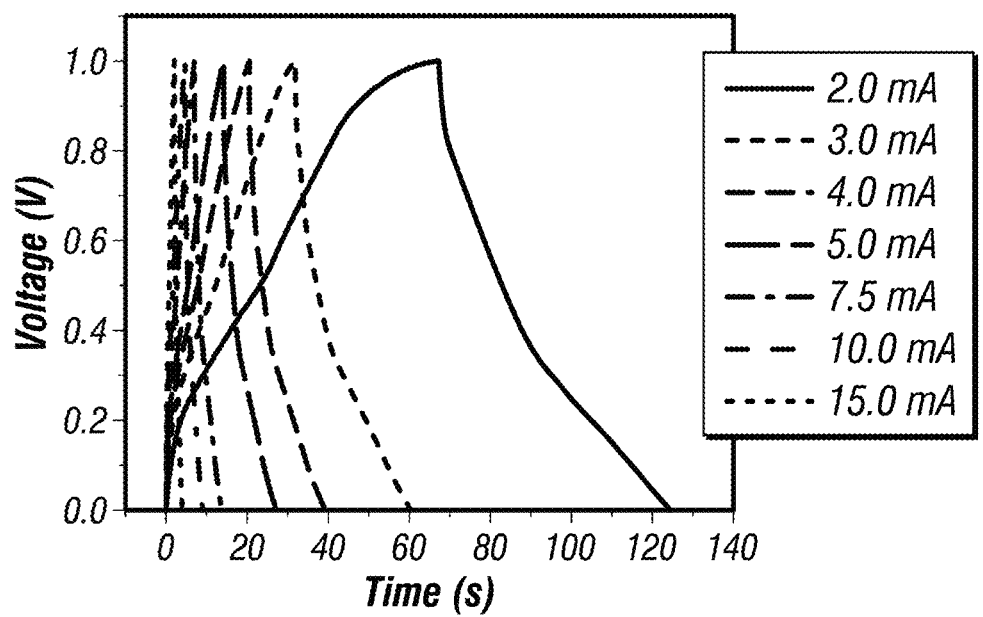

In order to estimate the percentage contributions from the EDL charge storage and faradaic mechanisms, CV curves were used for the analysis.[36] It was found that 70% of the capacitance contribution is from the EDL mechanism and the other 30% is from faradaic mechanism when calculated from the CV curve scanned at a rate of 25 mV s$^{-1}$ (FIG. 11C). The estimation of contributions of capacitance from EDL and faradaic charge storage mechanisms from the CV curves is explained below. The GCD curves (FIG. 11D) of the VGCF hybrid supercapacitor represents typical charge/discharge profiles of a supercapacitor with two distinguishable slopes. These two slopes are due to the two different charge storage viz. EDL and faradaic mechanisms exhibited by the VGCF hybrid electrode.

Figure 11E:
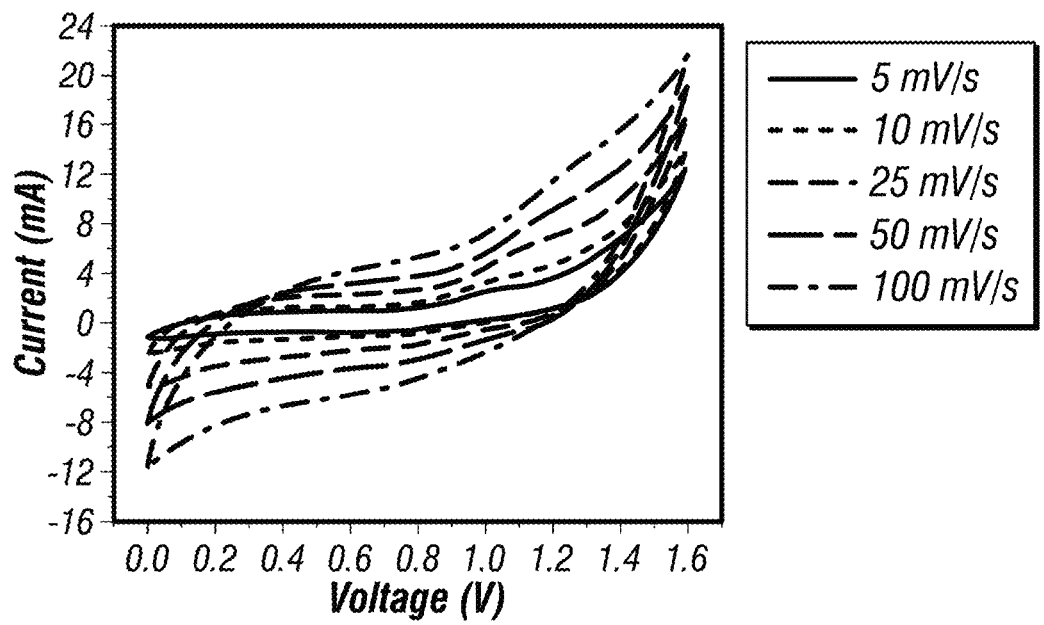

To integrate with flexible electronic devices, the electrolyte used in the fabrication of the supercapacitor should be solid as it should be flexible and not leaking whilst the integrated device undergoes continuous bending and twisting cycles. Hence leak-proof supercapacitors are essential for applications in flexible and wearable electronics. A symmetric ASSC was also fabricated using a PVA/H$_3$PO$_4$ gel electrolyte. The Nyquist plot of the as fabricated VGCF ASSC (FIG. 13) represents a comparatively higher internal resistance compared with the aqueous electrolyte, which is as expected due to the use of solid-state polymer electrolyte. The CV study of VGCF ASSC performed within a potential window of 0-1.6 V (FIG. 11E) shows slightly sloped curves which represents good charge storage capabilities of the supercapacitor. The VGCF ASSC exhibited a maximum specific capacitance of 213.5 F g$^{-1}$ at a scan rate of 5 mV It may be noted here that the performance of VGCF ASSC is evaluated within a potential window of 0-1.6 V. The VGCF ASSC displayed a high energy density of 76 Wh kg$^{-1}$, which is very high when compared with the graphene based supercapacitors[14, 17-22] and many of the carbon composite electrodes based supercapacitors.[37]

Figure 11F:
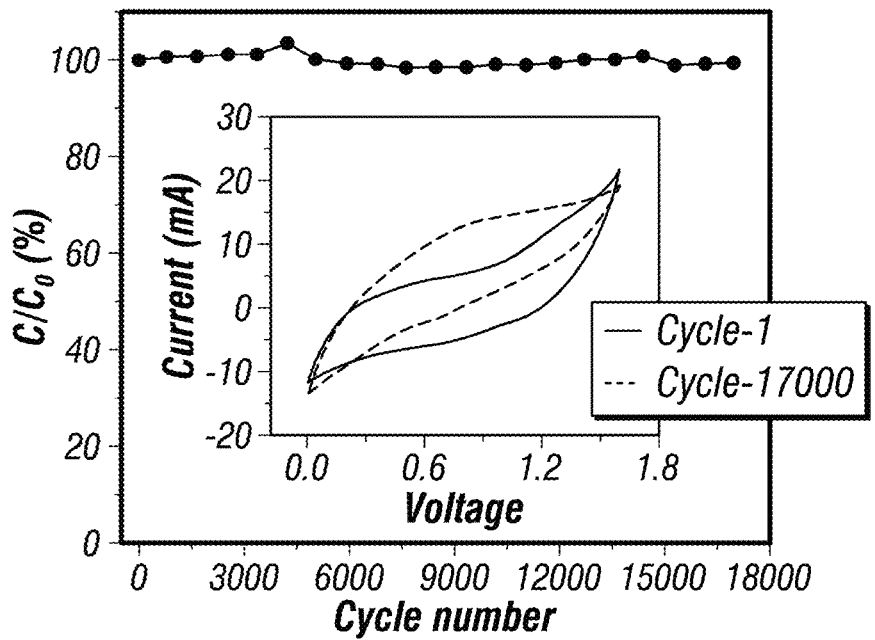
Figure 11G:
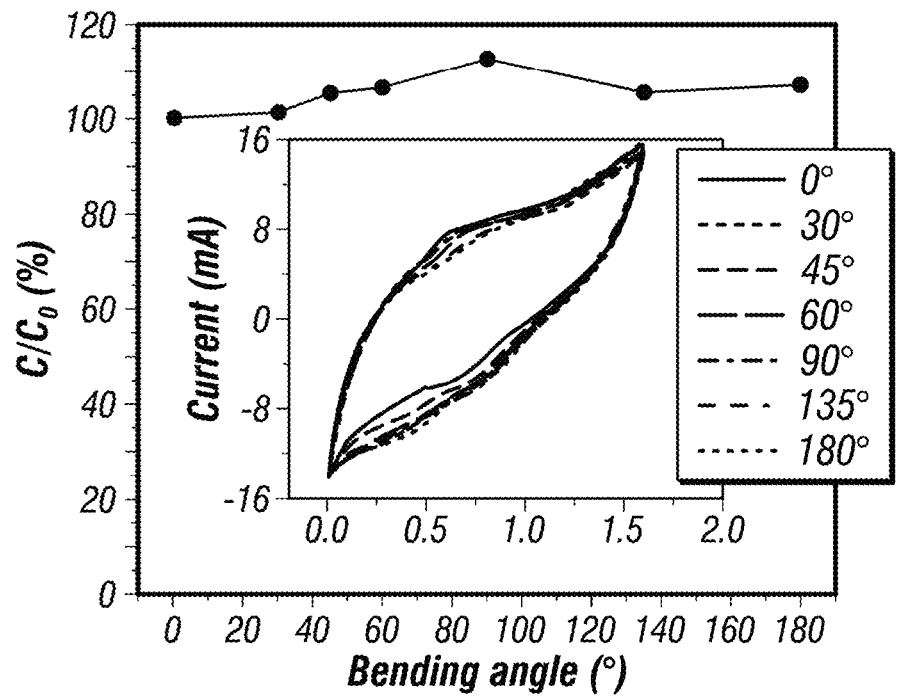
Figure 13:
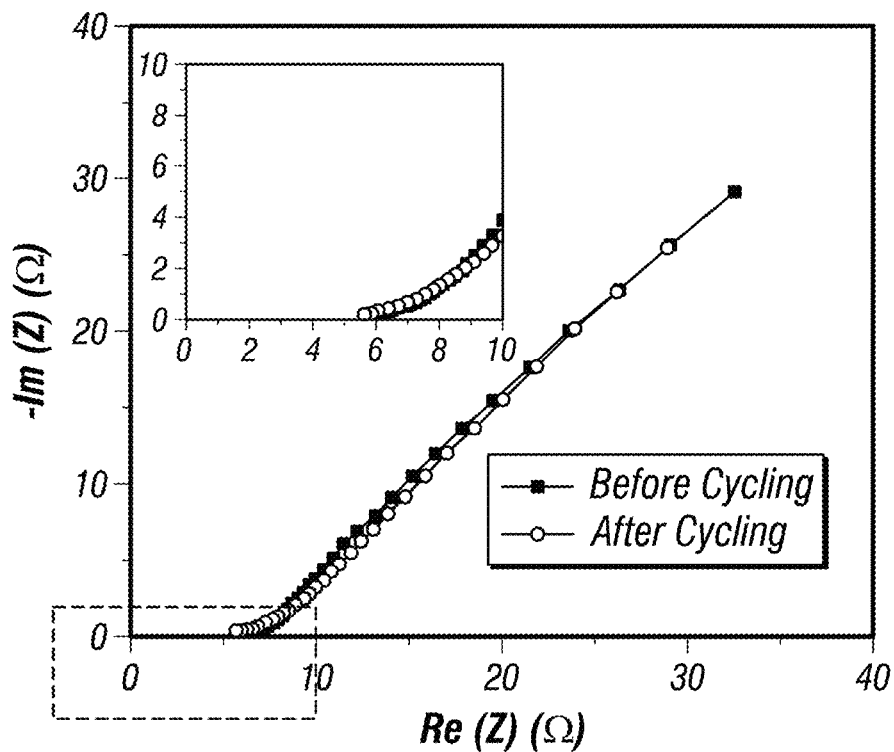
FIG. 13 shows Nyquist plot of the VGCF ASSC (inset: Nyquist plot at high-frequency region) before and after cycling.

The enhanced electrochemical performance of the VGCF ASSC is attributed to the 3D mesoporous architecture formed by the vertical-alignment of pristine graphene sheets. The present study proclaims a simple method to improve the electrochemical performances of the supercapacitor by just designing the mesoporous electrode architecture using 2D graphene sheets. Apart from the good electrochemical features, the VGCF ASSC displayed a stable electrochemical cycling performance for continuous 17000 cycles and obtained 99.4% capacitance retention (FIG. 11F). The CV curves of first and the 17000$^{th}$ cycles are shown as an inset image in FIG. 11F, which shows no significant difference in the area under the curve although there is a slight change in its profile. The VGCF ASSC exhibited a comparatively lower ESR after cycling (FIG. 13). This may be due to the surface activation or pore opening within the VGCF hybrid electrode.[30] The flexibility of the VGCF ASSC was examined by bending the same at different bending angles such as 0, 30, 45, 60, 90, 135, and 180°. It exhibited 100% capacitance retention even at a severe bending angle of 180° (FIG. 11G). No significant change in the CV profiles can be observed at different bending angles of the VGCF ASSC and is depicted as an inset image in FIG. 11G.

Figure 11H:
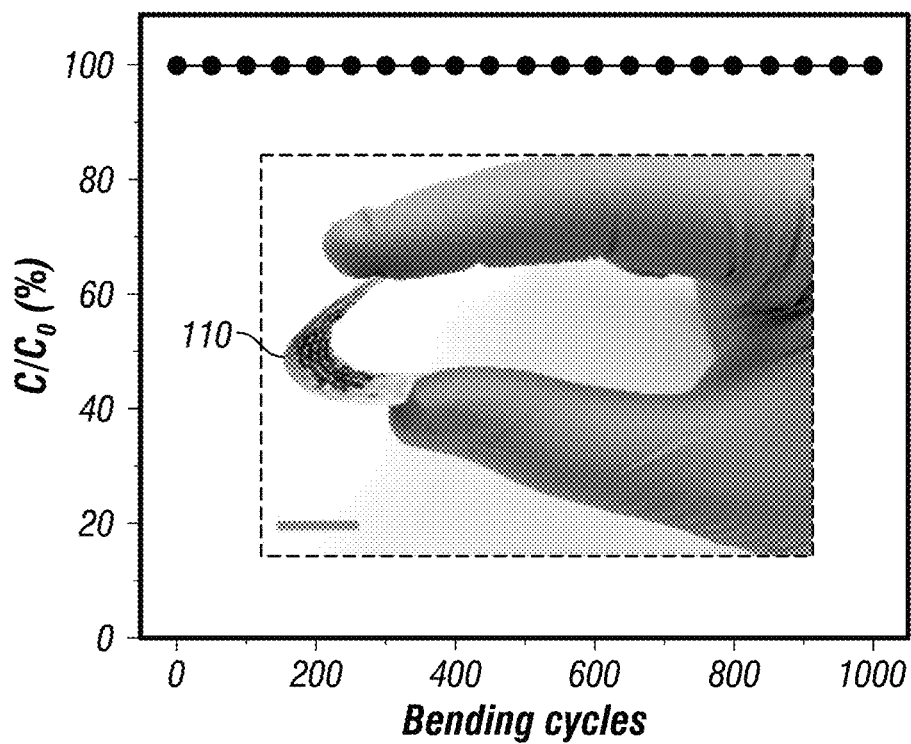
Figure 11I:
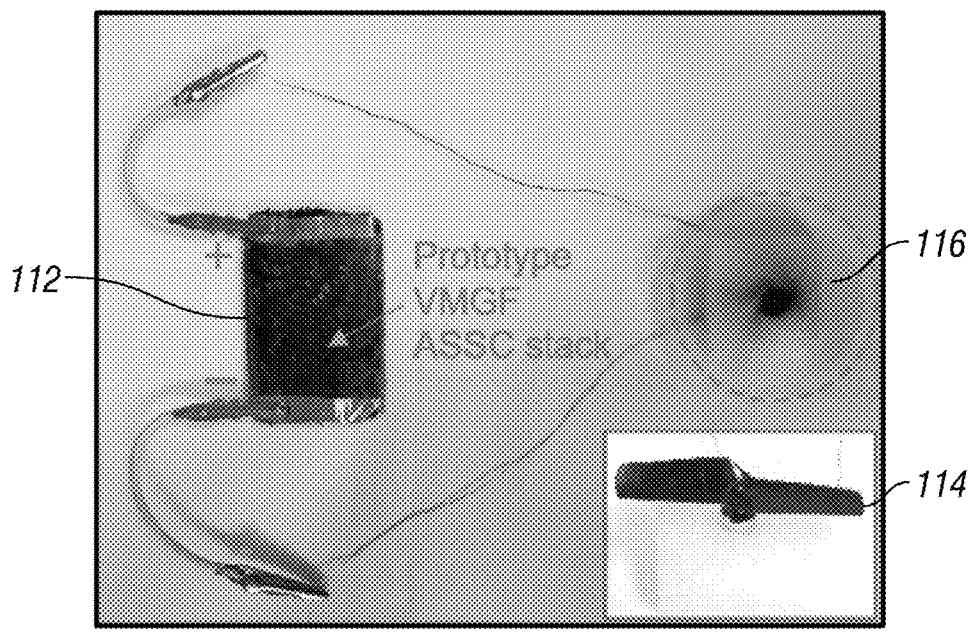
FIG. 11I is a photograph of a prototype ASSC stack testing: the prototype VGCF ASSC stack fabricated using two VGCF ASSCs (5 cm×3 cm) connected in parallel powering a toy drone propeller fan (inset: digital photograph of the toy drone propeller fan, scale bar: 1 cm).
Figure 14:
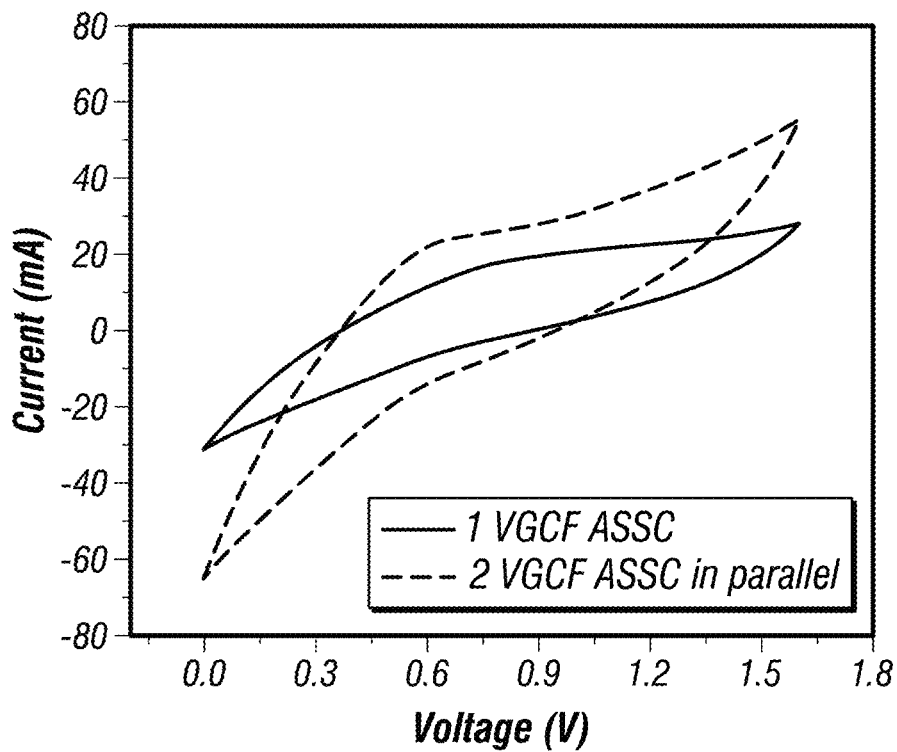
FIG. 14 shows CV curves of single VGCF ASSC cell and two VGCF ASSC cells connected in parallel.

A flexible supercapacitor should withstand its performance even after several continuous bending cycles. To test the capacitance retention at several bending cycles, an CV study was performed while bending it at an angle of 90° for 1000 cycles at a constant scan rate of 100 mV The capacitance retention of the VGCF ASSC at different bending cycles is depicted in FIG. 11H, which shows a 100% capacitance retention even after 1000 bending cycles. A digital photograph of the VGCF ASSC 110 while bending at an angle of 90° is given as an inset image in FIG. 11H. This shows the good bendability of the VGCF ASSC. A prototype VGCF ASSC stack 112 fabricated using two VGCF ASSCs connected in parallel powering the propeller fan 114 of a toy drone 116 is shown in FIG. 11I and the inset figure shows the digital photograph of the toy drone propeller fan 114. The CV curves of single VGCF ASSC and two VGCF ASSCs connected in parallel performed at a scan rate of 50 m V s$^{-1}$ is given in FIG. 14. The prototype VGCF ASSC 112 was able to run a toy drone propeller fan 114. Also, the device could be bent at an angle of 90° during its operation no difference in the functioning of the propeller fan 114 was observed. This shows its high potential in flexible and wearable devices which undergoes bending during its operation. Hence the present study represents a simple, facile and cost-effective method of synthesizing vertically-stacked graphene electrodes for application in flexible supercapacitors.

Materials and Methods

The following details a non-limiting example of one embodiment for fabrication of VGCF Hybrid. The disclosure contemplates variations that result in the VGCF Hybrid as disclosed herein.

Materials: CFs were purchased from Fibre Glast, USA. Graphene (product no: N002-PDR-HD, batch no: 1710261A, average lateral dimension: 4 μm, thickness: 0.35-2 nm, oxygen content: <2.5%, specific surface area: 400-800 m$^2$/g) obtained from Angstron Materials, Global Graphene Group Inc, USA. Nickel nitrate hexahydrate [Ni(NO$_3$)$_2$.6H$_2$O] and isopropyl alcohol were purchased from Sigma-Aldrich, USA.

Synthesis of VGCF Hybrid: The VGCF was synthesized by a simple electrophoretic deposition method. Initially, 20 mg of graphene and 5 mM of Ni (NO$_3$)$_2$.6H$_2$O dispersed in 50 ml isopropyl alcohol are mixed well via ultrasonication for 30 minutes. A two-electrode cell configuration was used for depositing graphene sheets on CF substrate in which the CF substrate served as the working electrode and platinum foil as the counter electrode. The vertically-stacked graphene sheets were deposited on CF substrate by applying a constant D.C. voltage of 50 V for a period of 30 minutes with the help of a D.C. power supply (TekPower TP12001X 120V DC Variable Switching Power Supply Output 0-120V @1A). The VGCF thus obtained was dried in an oven at 100° C. for 2 hours prior to use as electrode-cum-current collector for fabricating the flexible supercapacitor.

Materials Characterizations: The morphology of the graphene sheets was examined by TEM (FEI Tecnai F30 TEM) imaging. The morphology of the VGCF hybrid was characterized by SEM (Zeiss ULTRA-55 FEG SEM) imaging and AFM (Anasys Instruments NanoIR2) imaging. Raman spectroscopic analysis was carried out using Renishaw RM 1000B Micro-Raman Spectrometer with Ar-514 nm excitation unit. The surface chemical states of the graphene sheets and VGCF hybrids were investigated by XPS (Physical Electronics 5400 ESCA). The high-resolution XPS spectra corresponding to C1s and O1s of the graphene sheets, and C1s, O1s and Ni2p peaks of the VGCF hybrid electrode were analyzed by using the XPS peak version 4.1 program, where Shirley-type background and Gaussian-Lorentzian distributions are used to fit the baselines and the XPS peaks, respectively. The BET surface area measurement of the VGCF hybrid electrode is carried out by a BET Surface Analyzer (Quantachrome® ASiQwin™ Quantachrome Instruments) using nitrogen as the adsorbed gas. The electrochemical studies of VGCF hybrid electrodes as well as the supercapacitor were examined using an electrochemical workstation (Bio-Logic Science Instruments, model SP-150). The mass of CF substrate before and after the deposition of graphene sheets was taken using a microbalance (Mettler Toledo NewClassic MF, model MS 104S/03) to estimate the mass of the active materials used in the supercapacitor electrodes. The mass of electrode-active materials (graphene and nickel hydroxide) is 1.5 mg in the VGCF hybrid electrode and the mass of carbon fiber current collector is not considered.

Supercapacitor Electrode Characterizations: The VGCF hybrid electrode was characterized by EIS, CV and GCD measurements in a three-electrode cell compartment. Here, VGCF was used as the working electrode, platinum foil as the counter electrode and Ag/AgCl (in 1 M KCl) as the reference electrode. 1 M $H_3PO_4$ aqueous electrolyte was used for the electrochemical study. The EIS measurement was performed with the frequency range from $10^6$-0.1 Hz at 0.2 V. The CV study was performed in a potential window from 0-1 V for the single electrode testing in a three-electrode configuration. The scan rates opted for the CV studies were 100, 50, 25, 10, 5 and 3 mV $s^{-1}$.

Fabrication and testing of VGCF supercapacitor and ASSC: Sandwich-type symmetric supercapacitor was assembled using two identical VGCF hybrids as electrode-cum-current collector. During the synthesis of VGCF hybrid electrode, a portion of the CF substrate was left uncoated with the graphene sheets and this portion was used for connecting current collector leads for the supercapacitor. No separate current collectors were used in this study. The Whatman™ filter paper served as the separator membrane. The VGCF hybrid supercapacitor was tested in 1 M $H_3PO_4$ aqueous electrolyte whereas PVA/$H_3PO_4$ gel was used as a solid-state electrolyte to test the performance of the VGCF ASSC. The EIS measurement was performed with the frequency range from $10^6$-0.1 Hz at 0.2 V. The CV study was performed in a potential window from 0-1.6 V for the VGCF ASSC. The scan rates opted for the CV studies were 100, 50, 25, 10 and 5 mV $s^{-1}$. The GCD measurement was also carried out in a voltage window of 0-1.0 V for the individual VGCF hybrid electrodes and 0-1.6 V for the flexible VGCF ASSC.

Bending test of VGCF ASSC: The flexibility of the VGCF ASSC was tested by bending the supercapacitor at various angles such as 0° (straight position), 30°, 45°, 60°, 90°, 135° and 180°. The CV study of the supercapacitor was performed while bending the supercapacitor at different bending angles at a constant scan rate of 100 mV $s^{-1}$.

Supporting Information

Calculation of Capacitance Contribution from Different Charge Storage Mechanisms (a) b-Value Calculations To understand the contribution of capacitances from different charge storage mechanisms in the VGCF symmetric supercapacitor electrode, CV analysis has been performed at different scan rates. By using Cottrell's equation[38]

$$i = a\upsilon^b \qquad (1)$$

we can understand how the current varies with different scan rates at a voltage, V. Thus, we need to determine the value of b, which lies between $0.5 \leq b \leq 1$, and will tell us whether the current and charges stored are capacitive or by solid-state ion-diffusion. To determine this value of b, if we take log on both sides in the Cottrell's equation we get log i=b log $\upsilon$+a. Now if we sketch a curve between log i vs log $\tau$, for a given voltage V, we should get a straight line and the b-value for that specific voltage will be given by the slope of that straight line.

Figure 15:
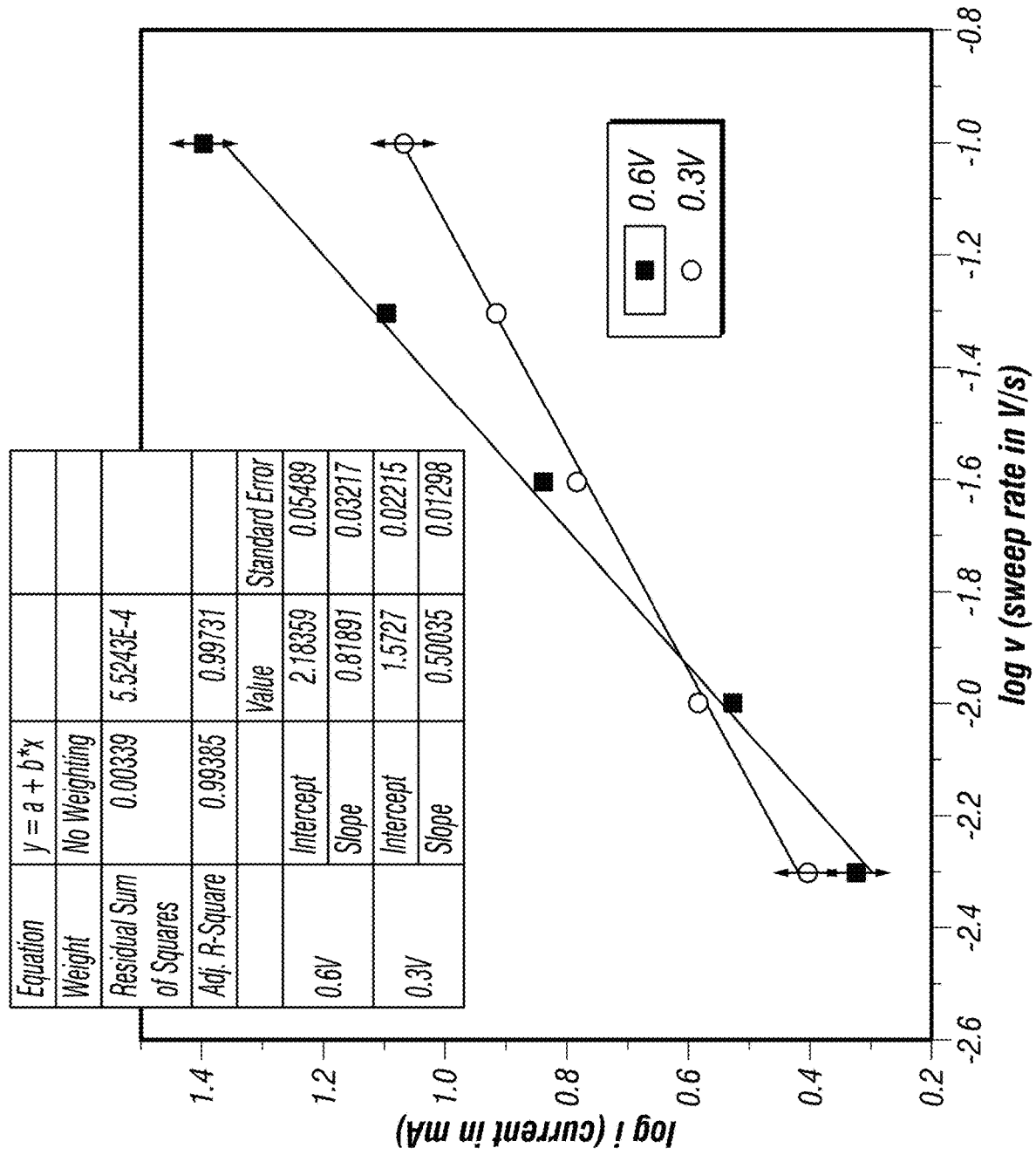
FIG. 15 is a plot of log i vs log v depicting how to determine the b-value by plotting the curves between log i and log v which should come out to be a straight line. The slope of this line gives value of b. For demonstration purpose these curves have been plotted and compared for two voltage values of 0.6 V and 0.3 V. The slope (b-value) calculated at 0.6 V comes out to be 0.82 which is indicative of more capacitive type charge storage, while the slope (b-value) at 0.3 V is calculated to be 0.5 which is indicative of highly diffusion controlled.

The b-value calculation from the log i vs log $\upsilon$ curve is shown in FIG. 15. For demonstration purpose these curves have been plotted and compared for two voltage values of 0.6 V and 0.3 V. The slope (b-value) calculated at 0.6 V comes out to be 0.82 which is indicative of more capacitive type charge storage, while the slope (b-value) at 0.3 V is calculated to be 0.5, which is indicative of highly diffusion controlled current and charge storage mechanism. It shows that the b-value ranges from $0.5 \leq b \leq 1$ and it approaches to a minimum of 0.5 at around 0.3 V, which signifies that at around 0.3 V, the charge storage mechanism becomes highly diffusion controlled. For all other values of V, the value of b lies between 0.5 and 1 which means that at these voltages, the charge storage remains shared between diffusion controlled and capacitive mechanism.

Figure 16:
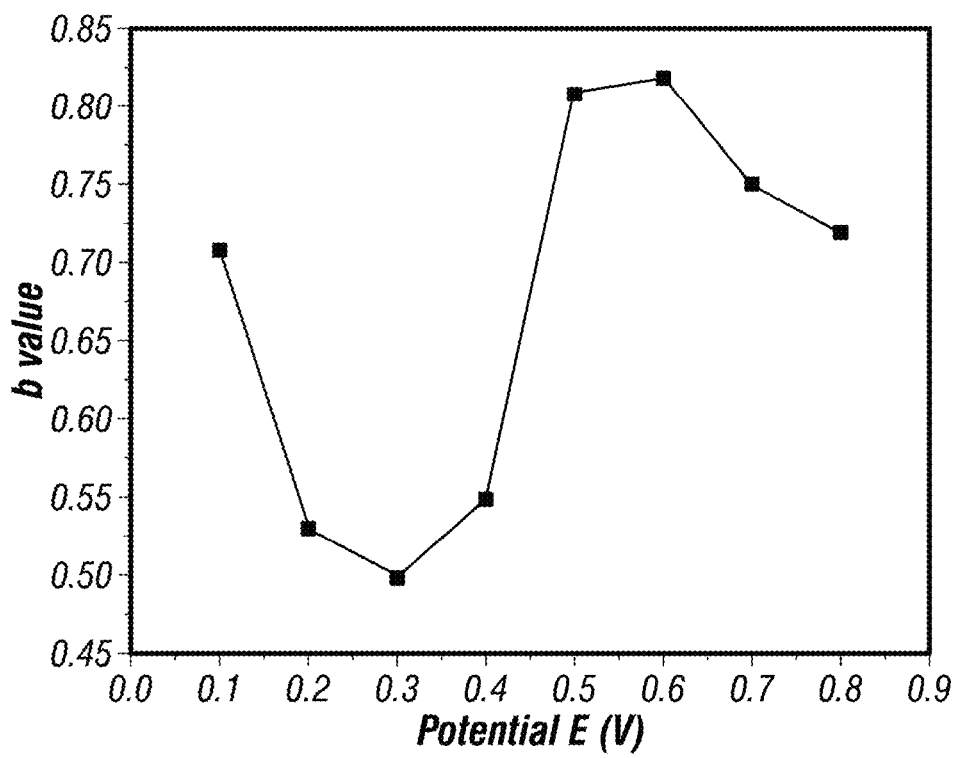
FIG. 16 is a plot of b-value vs V, where b-value ranges from 0.5≤b≤1. When the b-value approaches to a minimum of 0.5 at around 0.3 V, which signifies that at around 0.3 V, the charge storage mechanism becomes highly diffusion controlled. For all other values of V, the charge storage remains shared between diffusion controlled and capacitive mechanism.

Once we get the b-value on a specific voltage V, by doing similar calculations at different voltage values, a curve between the b-value and the operational voltage range (V) of the device can also be plotted. After calculating b-values at different voltages, a b vs V curve has been plotted and shown in FIG. 16. It can be observed from FIG. 16 that b-value approaches 0.5 (showing high solid-state ion-diffusion behavior) near the potential value of 0.3 V.[39] But looking at the CV curves in FIG. 11B, at different scan rates, the very typical behavior of minor shifting of redox peaks, dependent on the scan rates, will be found. Hence, that scan rate for the capacitive calculations which has the redox peak closest to 0.3 V should be chosen. From FIG. 11B, the CV obtained at 25 mV/s scan rate gives the redox peak closest to 0.3 V.

(b) k-Value Calculations

In a very similar analysis, the current at any given potential (V), is a combination of capacitive charges stored (i.e. non-diffusion-controlled) and the charges stored via diffusion-controlled mechanism. Thus, the current originating from these two mechanisms, can also be divided into two categories: (a) Capacitive current and (b) Current from solid-state ion-diffusion.[39] Therefore, mathematically using the Cottrell's equation, the total voltammetry current can be written in the equation form as $$i(V) = k_1\upsilon + k_2\upsilon^{1/2} \qquad (2)$$

where i(V) is the CV current at any given potential V, $k_1\upsilon$ is the contribution of current originating from capacitive type charge storage (both EDLC and pseudo capacitance), and $k_2\upsilon^{1/2}$ is the current originating from solid-state ion-diffusion. In order to calculate the value of $k_1$ and $k_2$ equation (4) can be rearranged in the following equation, $$\frac{i(V)}{v^{1/2}} = k_1 v^{1/2} + k_2 \quad (3)$$

Figure 17:
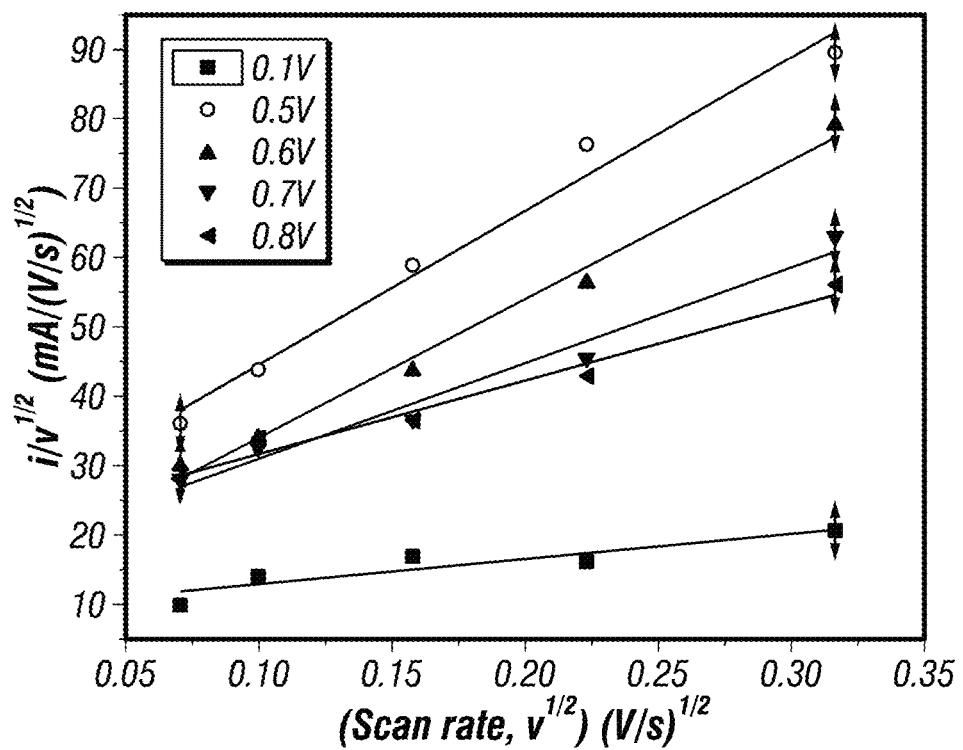
FIG. 17 is a plot showing the determination of $k_1$ and $k_2$ values calculated using eq. (3). After fitting the data, the slope of the line gives the $k_1$ value while the y-intercept gives the $k_2$ value.

Experimentally, current at different potentials can be collected from CV measurements, for varying scan rates $v$, and then a curve can be plotted between $$\frac{i(V)}{v^{1/2}}$$

and $v^{1/2}$. After the linear fitting of the data, $k_1$ value is calculated by the slope of the line and $k_2$ value is given by the intercept of the line on y axis. After knowing the values of $k_1$ and $k_2$ the capacitive contribution of the current (non-diffusion-controlled) and the current because of the solid-state ion-diffusion (i.e. diffusion-controlled) can be calculated individually at all given potentials(V). This analysis is shown in FIG. 17. Here after linearly fitting the data, the values of $k_1$ and $k_2$ are calculated at different potentials V.

These $k_1$ and $k_2$ values are unique to each potential value (V) in the CV Curve. After calculating the values of $k_1$ and $k_2$, at different potential (V) values, refer again back to eq. (2). Now at this point, "capacitive current ($i_{cap}$)" and "solid-state ion-diffusion current ($i_{sol}$)" can be calculated independently, for each potential value V, as shown below.

$i_{cap} = k_1 v$ $i_{sol} = k_2 v^{1/2}$

It can also be observed that capacitive and solid-state ion-diffusion currents are in a ratio of $k_1:k_2$. It was already discussed above why the CV curve of 25 mV/s scan rate for the capacitive contribution calculations was selected. Hence, an overlapping CV curve was plotted using the $i_{cap}$ values (only capacitive contribution) at 25 mV/s scan rate for different potential values, with the CV curve of total current at 25 mV/s scan rate. This is shown in FIG. 11C.

CONCLUSION

In summary, a hierarchical VGCF hybrid electrode with ultra-long cycling stability is developed for flexible supercapacitors. A high specific capacitance of 213.5 F g$^{-1}$ at a scan rate of 5 mV s$^{-1}$ is obtained in PVA/H$_3$PO$_4$ gel electrolyte with a high energy density of 76 Wh kg$^{-1}$. The high-performance of the VGCF is due to the vertical-stacking of 2D graphene sheets on the CF as it enabled a 3D mesoporous architecture to enhance the charge storage. The specific capacitance of the VGCF hybrid is the sum of EDL charge storage possessed by the graphene sheets, the faradaic charge storage exhibited by both the oxygen functional groups on the surface of VGCF hybrid, and also the faradaic charge storage possessed by the α-Ni(OH)$_2$ nanoparticles. The direct attachment of graphene sheets vertically on the CF result in facile charge transport and very low contact resistance as evidenced by the EIS measurements. The supercapacitors fabricated using VGCF hybrid electrodes can be functioned as a flexible and lightweight power source to drive the wearable electronics. This VGCF hybrid electrode can also be promising for a variety of other devices including sensors, fuel cells, solar cells, and batteries.

All references cited herein are expressly incorporated by reference in their entirety. It will be appreciated by persons skilled in the art that the present disclosure is not limited to what has been particularly shown and described herein above. In addition, unless mention was made above to the contrary, it should be noted that all of the accompanying drawings are not to scale. There are many different features to the present disclosure and it is contemplated that these features may be used together or separately. Thus, the disclosure should not be limited to any particular combination of features or to a particular application of the disclosure. Further, it should be understood that variations and modifications within the spirit and scope of the disclosure might occur to those skilled in the art to which the disclosure pertains. Accordingly, all expedient modifications readily attainable by one versed in the art from the disclosure set forth herein that are within the scope and spirit of the present disclosure are to be included as further embodiments of the present disclosure.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the disclosure, skilled artisans will appreciate that certain features are, for clarity, described herein in the context of separate embodiments, can also be provided in combination in a single embodiment. Conversely, various features that are, for brevity, described in the context of a single embodiment, can also be provided separately or in any sub-combination. Further, references to values stated in ranges include each and every value within that range.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

REFERENCES

[1] S. J. Varma, K. Sambath Kumar, S. Seal, S. Rajaraman, J. J. A. S. Thomas, 2018, 5, 1800340.
[2] J. Bae, M. K. Song, Y. J. Park, J. M. Kim, M. Liu, Z. L. J. A. C. I. E. Wang, 2011, 50, 1683-1687.
[3] Y. Fu, X. Cai, H. Wu, Z. Lv, S. Hou, M. Peng, X. Yu, D. J. A. m. Zou, 2012, 24, 5713-5718.
[4] J. Ren, L. Li, C. Chen, X. Chen, Z. Cai, L. Qiu, Y. Wang, X. Zhu, H. J. A. M. Peng, 2013, 25, 1155-1159.
[5] Y. Meng, Y. Zhao, C. Hu, H. Cheng, Y. Hu, Z. Zhang, G. Shi, L. J. A. m. Qu, 2013, 25, 2326-2331.
[6] aJ. Cherusseri, K. K. J. R. A. Kar, 2015, 5, 34335-34341; bJ. Cherusseri, K. K. J. J. o. M. C. A. Kar, 2016, 4, 9910-9922.

[7] L. Dong, C. Xu, Y. Li, Z. Pan, G. Liang, E. Zhou, F. Kang, Q. H. Yang, *Advanced Materials* 2016, 28, 9313-9319.

[8] aW. Liu, M. S. Song, B. Kong, Y. Cui, *Advanced materials* 2017, 29, 1603436; bL. Dong, C. Xu, Y. Li, Z.-H. Huang, F. Kang, Q.-H. Yang, X. Zhao, *Journal of Materials Chemistry A* 2016, 4, 4659-4685; cX. Cai, M. Peng, X. Yu, Y. Fu, D. Zou, *Journal of Materials Chemistry C* 2014, 2, 1184-1200.

[9] aJ. Wang, Y. L. Xu, X. Chen, X. F. Sun, *Compos Sci Technol* 2007, 67, 2981-2985; bS. R. Sivakkumar, J. M. Ko, D. Y. Kim, B. C. Kim, G. G. Wallace, *Electrochim Acta* 2007, 52, 7377-7385; cH. Lee, H. Kim, M. S. Cho, J. Choi, Y. Lee, *Electrochim Acta* 2011, 56, 7460-7466; dB. Zhang, Y. T. Xu, Y. F. Zheng, L. Z. Dai, M. Q. Zhang, J. Yang, Y. J. Chen, X. D. Chen, J. Y. Zhou, *Nanoscale Res Lett* 2011, 6.

[10] J. Cherusseri, K. K. Kar, *Rsc Adv* 2015, 5, 34335-34341.

[11] S. Yu, N. Yang, M. Vogel, S. Mandal, 0. A. Williams, S. Jiang, H. Schönherr, B. Yang, X. J. A. E. M. Jiang, 2018, 8, 1702947.

[12] N. Jha, P. Ramesh, E. Bekyarova, M. E. Itkis, R. C. J. A. E. M. Haddon, 2012, 2, 438-444.

[13] Y. Gao, Y. S. Zhou, M. Qian, X. N. He, J. Redepenning, P. Goodman, H. M. Li, L. Jiang, Y. F. J. C. Lu, 2013, 51, 52-58.

[14] J. Yan, T. Wei, B. Shao, Z. J. Fan, W. Z. Qian, M. L. Zhang, F. Wei, *Carbon* 2010, 48, 487-493.

[15] aJ. W. Lee, A. S. Hall, J.-D. Kim, T. E. J. C. o. M. Mallouk, 2012, 24, 1158-1164; bK. Wang, L. Li, T. Zhang, Z. J. E. Liu, 2014, 70, 612-617.

[16] aW. Lajnef, J.-M. Vinassa, O. Briat, E. J. M. R. Woirgard, 2005, 45, 1746-1749; bM. Catelani, L. Ciani, M. Marracci, B. J. M. R. Tellini, 2013, 53, 1676-1680.

[17] Z. J. Fan, Q. K. Zhao, T. Y. Li, J. Yan, Y. M. Ren, J. Feng, T. Wei, *Carbon* 2012, 50, 1699-1703.

[18] Q. Zhou, Z. B. Zhao, Y. S. Chen, H. Hu, J. S. Qiu, *J Mater Chem* 2012, 22, 6061-6066.

[19] Z. S. Wu, A. Winter, L. Chen, Y. Sun, A. Turchanin, X. Feng, K. Mullen, *Adv Mater* 2012, 24, 5130-5135.

[20] Y. M. Li, M. van Zijll, S. Chiang, N. Pan, *J Power Sources* 2011, 196, 6003-6006.

[21] Y. F. Liu, G. H. Yuan, Z. H. Jiang, Z. P. Yao, M. Yue, *Ionics* 2015, 21, 801-808.

[22] S. Biswas, L. T. Drzal, *Chem Mater* 2010, 22, 5667-5671.

[23] L. F. Lai, H. P. Yang, L. Wang, B. K. Teh, J. Q. Zhong, H. Chou, L. W. Chen, W. Chen, Z. X. Shen, R. S. Ruoff, J. Y. Lin, *Acs Nano* 2012, 6, 5941-5951.

[24] aL. Dong, C. Xu, Q. Yang, J. Fang, Y. Li, F. Kang, *Journal of Materials Chemistry A* 2015, 3, 4729-4737; bT. Qin, S. Peng, J. Hao, Y. Wen, Z. Wang, X. Wang, D. He, J. Zhang, J. Hou, G. Cao, *Advanced Energy Materials* 2017, 7, 1700409.

[25] M.-S. Wu, K.-H. Lin, *The Journal of Physical Chemistry C* 2010, 114, 6190-6196.

[26] C. Du, D. Heldbrant, N. J. M. L. Pan, 2002, 57, 434-438.

[27] C.-a. Tao, J. Wang, S. Qin, Y. Lv, Y. Long, H. Zhu, Z. Jiang, *Journal of Materials Chemistry* 2012, 22, 24856-24861.

[28] Y. He, Y. Zhang, X. Li, Z. Lv, X. Wang, Z. Liu, X. Huang, *Electrochimica Acta* 2018, 282, 618-625.

[29] aG. A. Snook, P. Kao, A. S. Best, *J Power Sources* 2011, 196, 1-12; bJ. X. Huang, R. B. Kaner, *Angew Chem Int Edit* 2004, 43, 5817-5821; cJ. H. Park, O. O. J. J. o. P. S. Park, 2002, 111, 185-190; dL. Wang, X. Lu, S. Lei, Y. J. J. o. M. C. A. Song, 2014, 2, 4491-4509; eH. Abe, T. Tanimoto, M. J. J. o. T. E. S. Nakayama, 2015, 162, A1952-A1956.

[30] J. Cherusseri, K. K. J. J. o. M. C. A. Kar, 2015, 3, 21586-21598.

[31] aC. Li, M. M. Islam, J. Moore, J. Sleppy, C. Morrison, K. Konstantinov, S. X. Dou, C. Renduchintala, J. Thomas, *Nature Communications* 2016, 7; bH. Moon, H. Lee, J. Kwon, Y. D. Suh, D. K. Kim, I. Ha, J. Yeo, S. Hong, S. H. Ko, *Scientific reports* 2017, 7, 41981; cA. Yadav, Y. Hunge, S. Kulkarni, *Journal of Materials Science: Materials in Electronics* 2018, 29, 16401-16409; dH. Chen, S. Zeng, M. Chen, Y. Zhang, Q. Li, *RSC Advances* 2017, 7, 8561-8566; eH. Yang, X. Zhu, E. Zhu, G. Lou, Y. Wu, Y. Lu, H. Wang, J. Song, Y. Tao, G. Pei, *Nanomaterials* 2019, 9, 345.

[32] aA. Mansour, C. Melendres, *Surface Science Spectra* 1994, 3, 255-262; bM. C. Biesinger, B. P. Payne, A. P. Grosvenor, L. W. Lau, A. R. Gerson, R. S. C. Smart, *Applied Surface Science* 2011, 257, 2717-2730.

[33] L. G. Bulusheva, M. Kanygin, V. Arkhipov, K. Popov, Y. V. Fedoseeva, D. Smirnov, A. Okotrub, *The Journal of Physical Chemistry C* 2017, 121, 5108-5114.

[34] aA. Bostwick, T. Ohta, T. Seyller, K. Horn, E. Rotenberg, *Nature physics* 2007, 3, 36; bT. Ohta, A. Bostwick, T. Seyller, K. Horn, E. Rotenberg, *Science* 2006, 313, 951-954.

[35] aP. Shi, R. Chen, L. Li, J. An, L. Hua, J. Zhou, B. Liu, P. Chen, W. Huang, G. Sun, *Nanoscale* 2018, 10, 5442-5448; bP. Sirisinudomkit, P. Iamprasertkun, A. Krittayavathananon, T. Pettong, P. Dittanet, P. Kidkhunthod, M. Sawangphruk, *Sustainable Energy &Fuels* 2017, 1, 275-279; cY. Zhu, C. Cao, S. Tao, W. Chu, Z. Wu, Y. Li, *Scientific reports* 2014, 4, 5787; dB. R. Wiston, M. Ashok, *Materials Letters* 2019, 235, 76-79.

[36] aJ. J. Shao, X. Y. Zhou, Q. Liu, R. J. Zou, W. Y. Li, J. M. Yang, J. Q. Hu, *J Mater Chem A* 2015, 3, 6168-6176; bK. Brezesinski, J. Wang, J. Haetge, C. Reitz, S. O. Steinmueller, S. H. Tolbert, B. M. Smarsly, B. Dunn, T. Brezesinski, *Journal of the American Chemical Society* 2010, 132, 6982-6990; cJ. Wang, J. Polleux, J. Lim, B. Dunn, *J Phys Chem C* 2007, 111, 14925-14931.

[37] aL. Yuan, X.-H. Lu, X. Xiao, T. Zhai, J. Dai, F. Zhang, B. Hu, X. Wang, L. Gong, J. Chen, *ACS nano* 2011, 6, 656-661; bL. Dong, C. Xu, Y. Li, C. Wu, B. Jiang, Q. Yang, E. Zhou, F. Kang, Q. H. Yang, *Advanced Materials* 2016, 28, 1675-1681; cY.-K. Hsu, Y.-C. Chen, Y.-G. Lin, L.-C. Chen, K.-H. Chen, *Journal of Materials Chemistry* 2012, 22, 3383-3387.

[38] Lindstrom, H.; Sodergren, S.; Solbrand, A.; Rensmo, H.; Hjelm, J.; Hagfeldt, A.; Lindquist, S. E. J. Phys. Chem. B 1997, 101, 7717.

[39] Brezesinski, T.; Wang, J.; Polleux, J.; Dunn, B.; Tolbert, S. H. Templated Nanocrystal-Based Porous TiO2 Films for Next-Generation Electrochemical Capacitors. J. Am. Chem. Soc. 2009, 131, 1802-1809.

What is claimed is:

1. A hybrid electrode comprising:
a substrate comprising carbon fibers; and
graphene sheets vertically stacked on and electrically connected to the carbon fibers,
wherein the hybrid electrode has about 100% capacitance retention after at least 100,000 cycles.

2. The hybrid electrode of claim 1, wherein the hybrid electrode has about 100% capacitance retention after at least 1,000 bending cycles.

3. The hybrid electrode of claim 1, wherein the carbon fibers have an average diameter of around 6 μm.

4. The hybrid electrode of claim 1, wherein the hybrid electrode has mesoporous nanostructure.

5. A method of making the hybrid electrode of claim 1, the method comprising:
   placing a working electrode comprising the substrate comprising carbon fibers in a metallic salt solution, the metallic salt solution dissolved in a solvent and having graphene disbursed therein;
   electrically connecting the working electrode to a counter electrode; and
   applying a voltage to the working electrode to electrophoretically deposit graphene on the substrate comprising carbon fibers; and
   drying the graphene deposited on the carbon fiber to thereby form the graphene sheets vertically stacked on and electrically connected to the carbon fibers.

6. The method of claim 5, wherein the metallic salt solution is a nickel solution.

7. The method of claim 6, wherein the nickel solution is a nickel nitrate solution.

8. The method of claim 1, wherein the solvent is an alcohol-based solvent.

9. The method of claim 1, wherein the graphene is disbursed in the metallic salt solution by ultrasonically mixing the graphene into the metallic salt solution.

10. The method of claim 9, wherein ultrasonication is used for 30 minutes to mix the graphene into the metallic salt solution.

11. The method of claim 5, wherein the drying comprises drying in an oven.

* * * * *